July 4, 1961

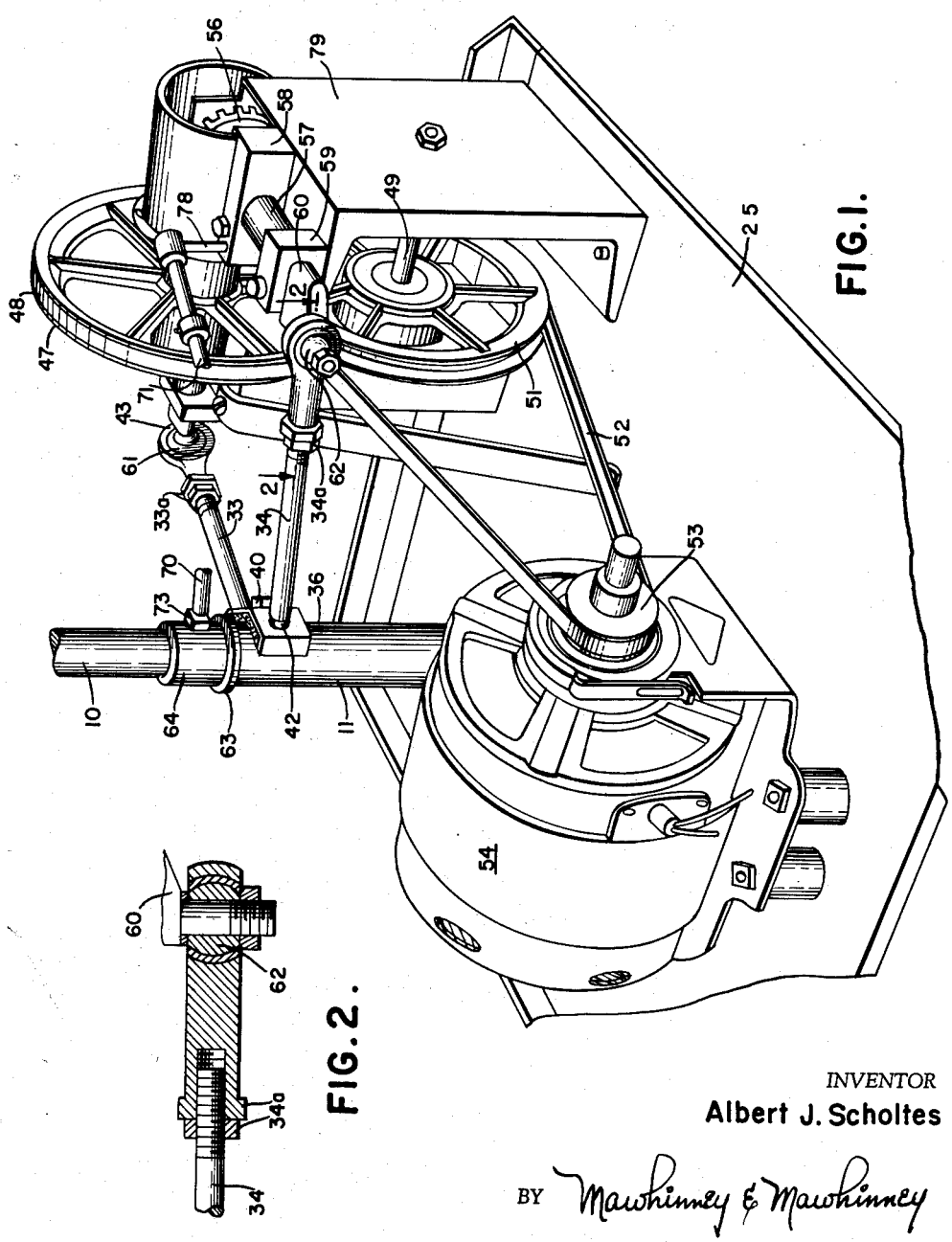

A. J. SCHOLTES 2,990,720

MECHANICAL MOVEMENT

Filed March 17, 1960

INVENTOR.
A. J. Scholtes

July 4, 1961
A. J. SCHOLTES
2,990,720
MECHANICAL MOVEMENT
Filed March 17, 1960
17 Sheets-Sheet 3
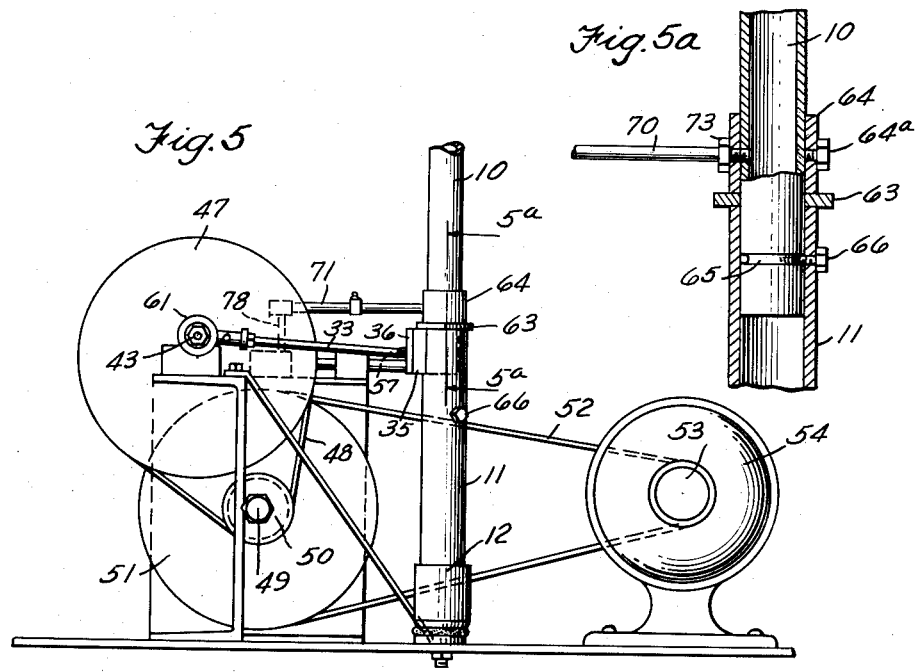
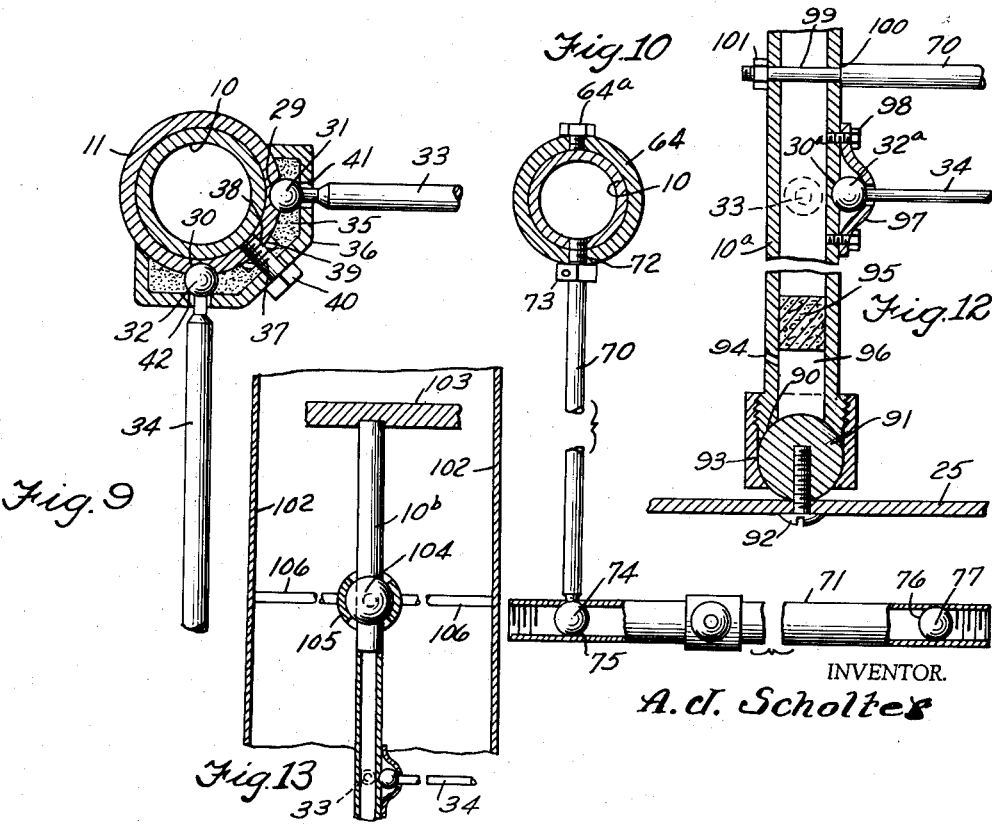
INVENTOR.
A. J. Scholtes

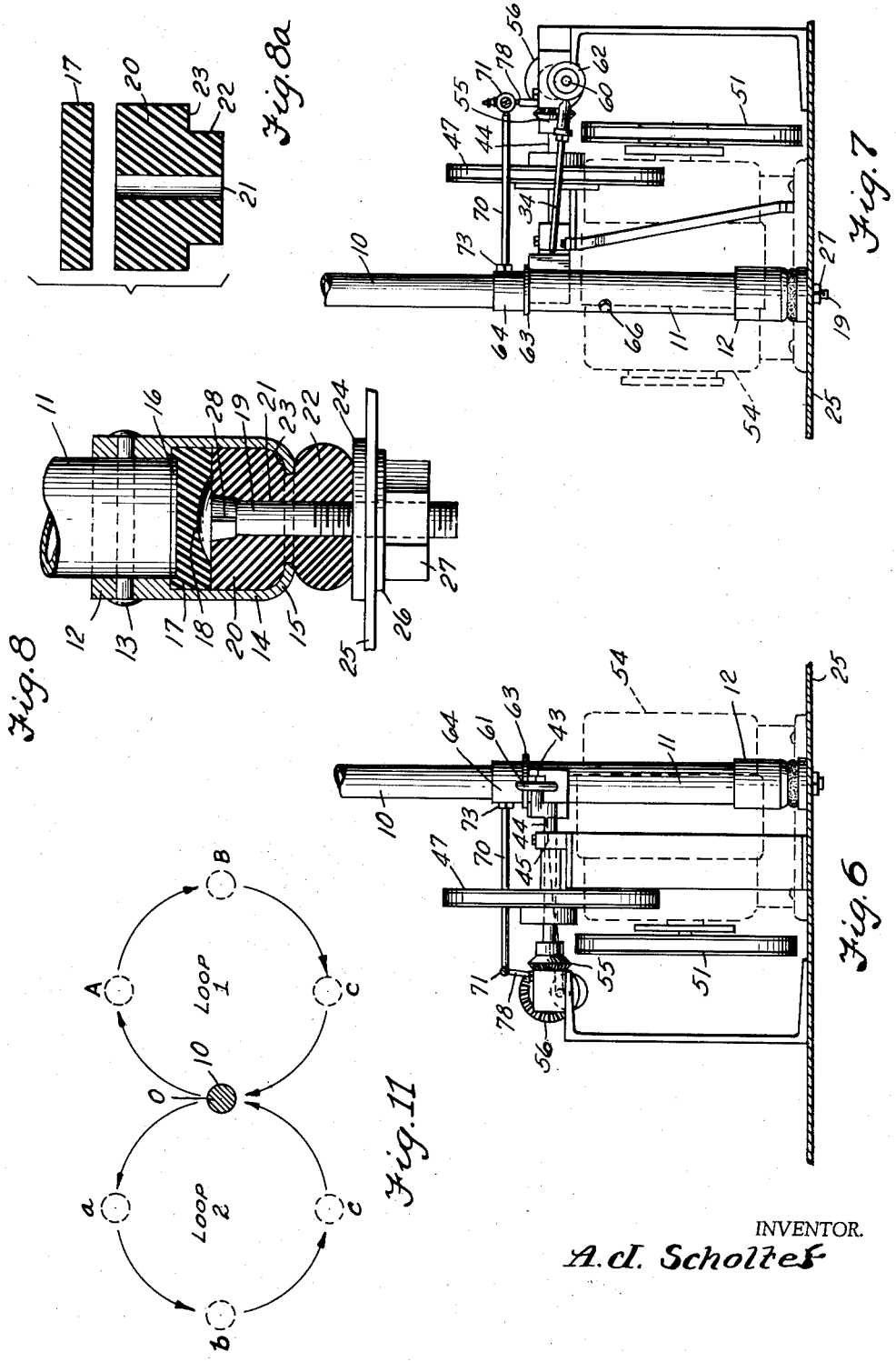

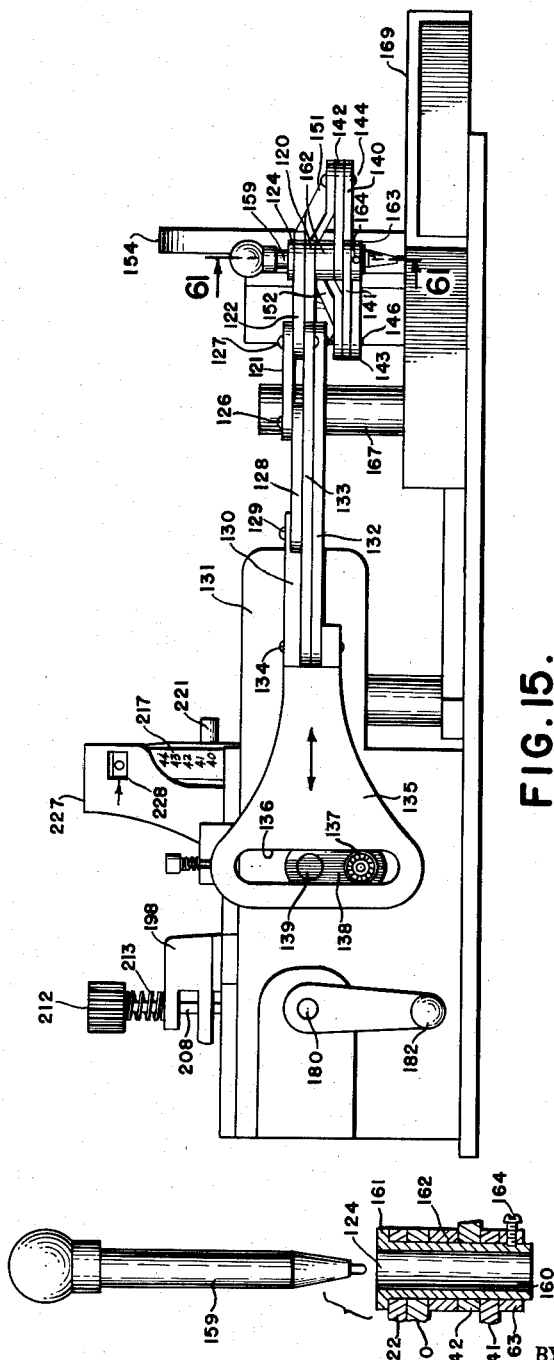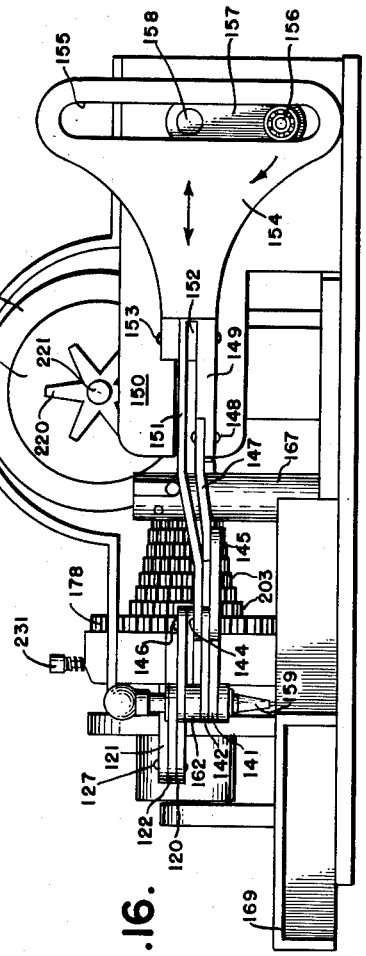

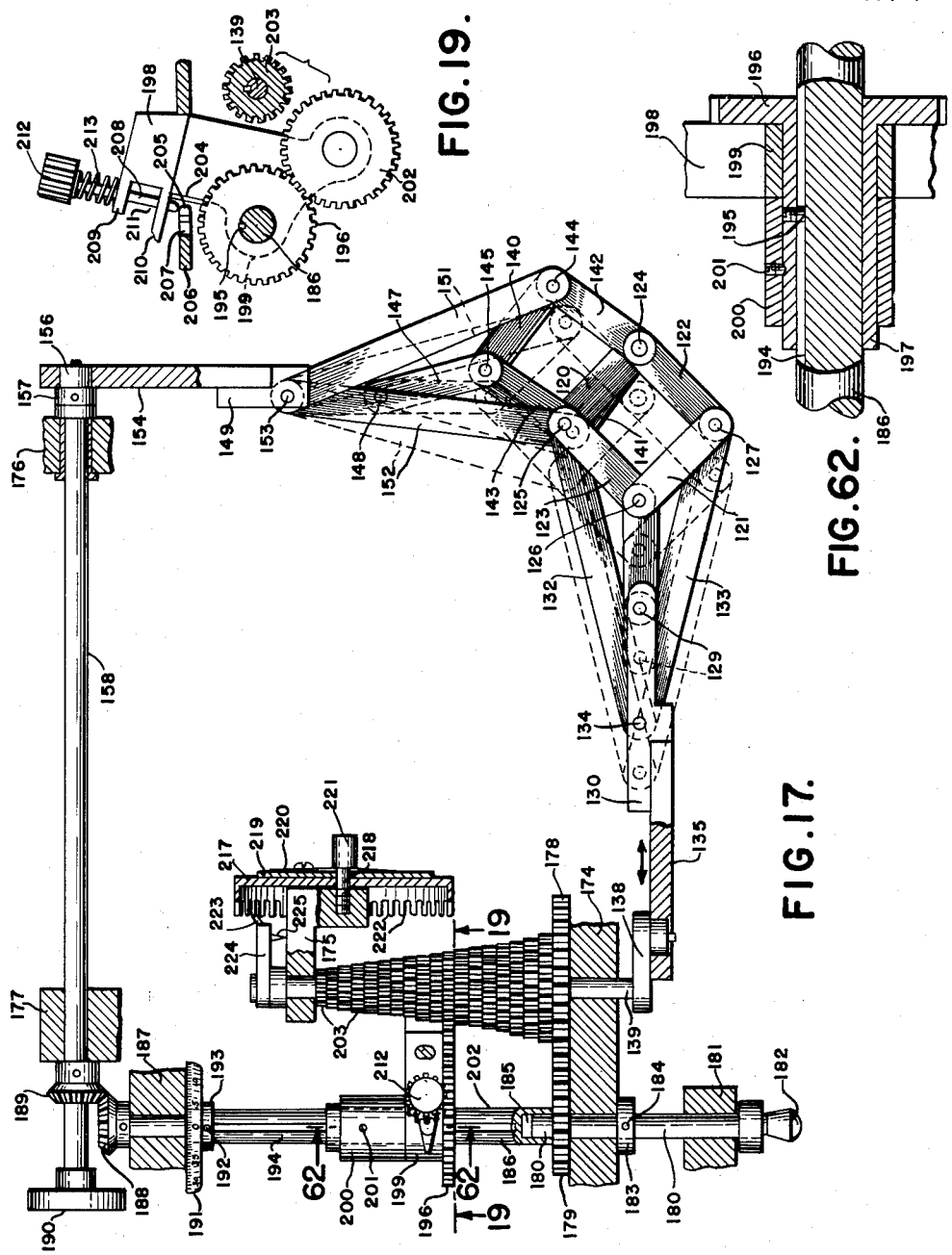

July 4, 1961  A. J. SCHOLTES  2,990,720
MECHANICAL MOVEMENT
Filed March 17, 1960  17 Sheets-Sheet 8
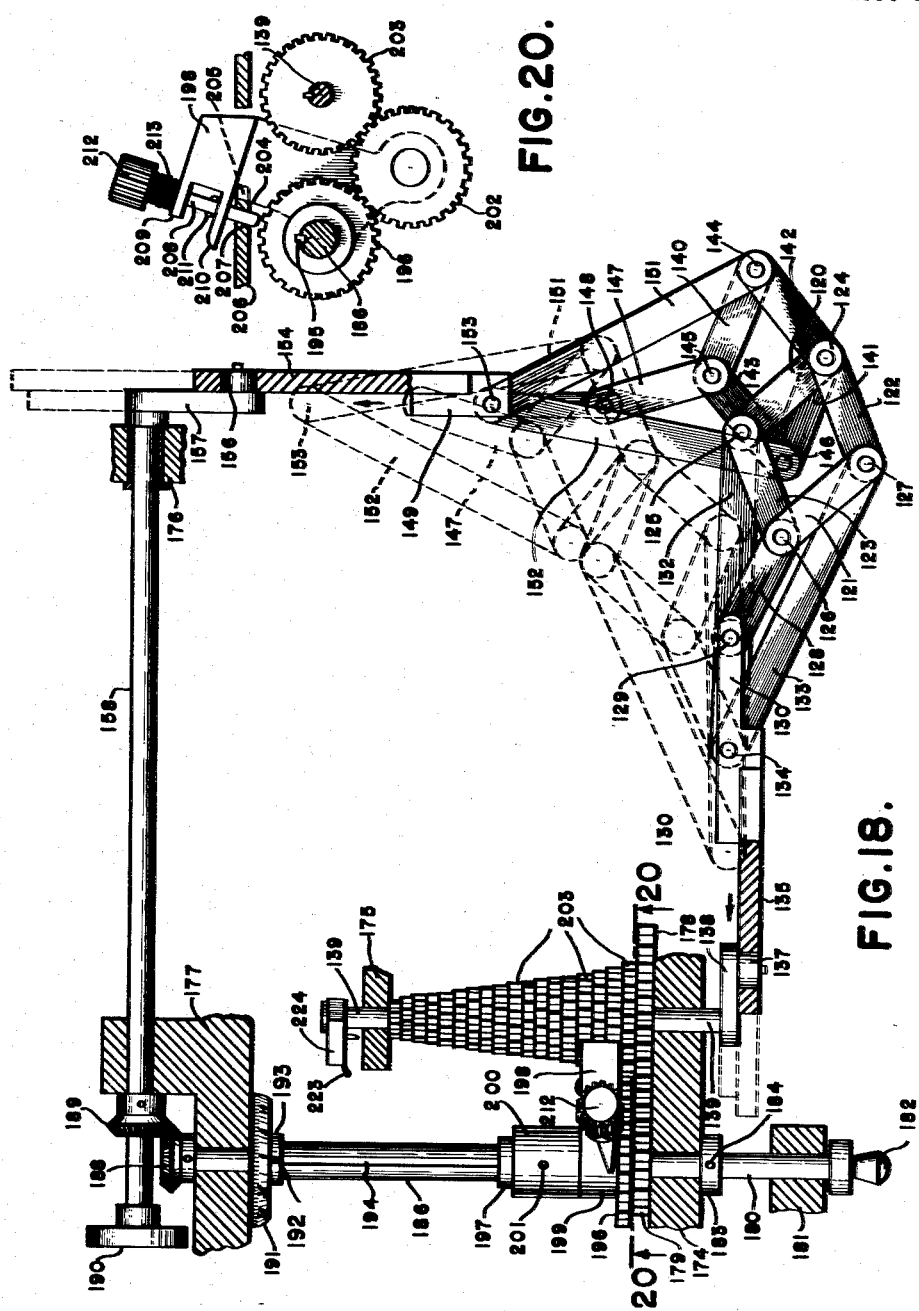
INVENTOR
A. J. Scholtes
BY Mawhinney & Mawhinney
ATTORNEYS

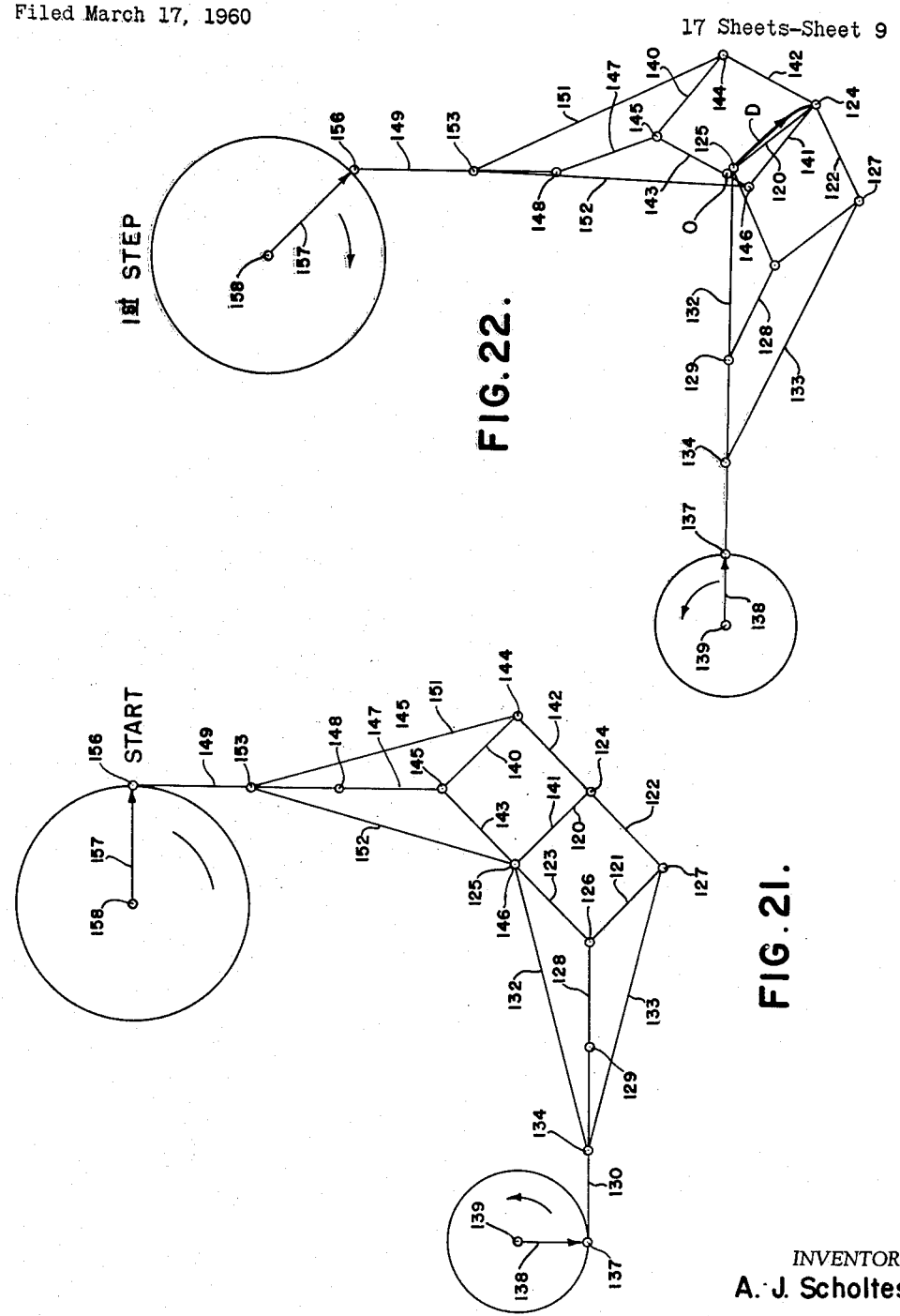

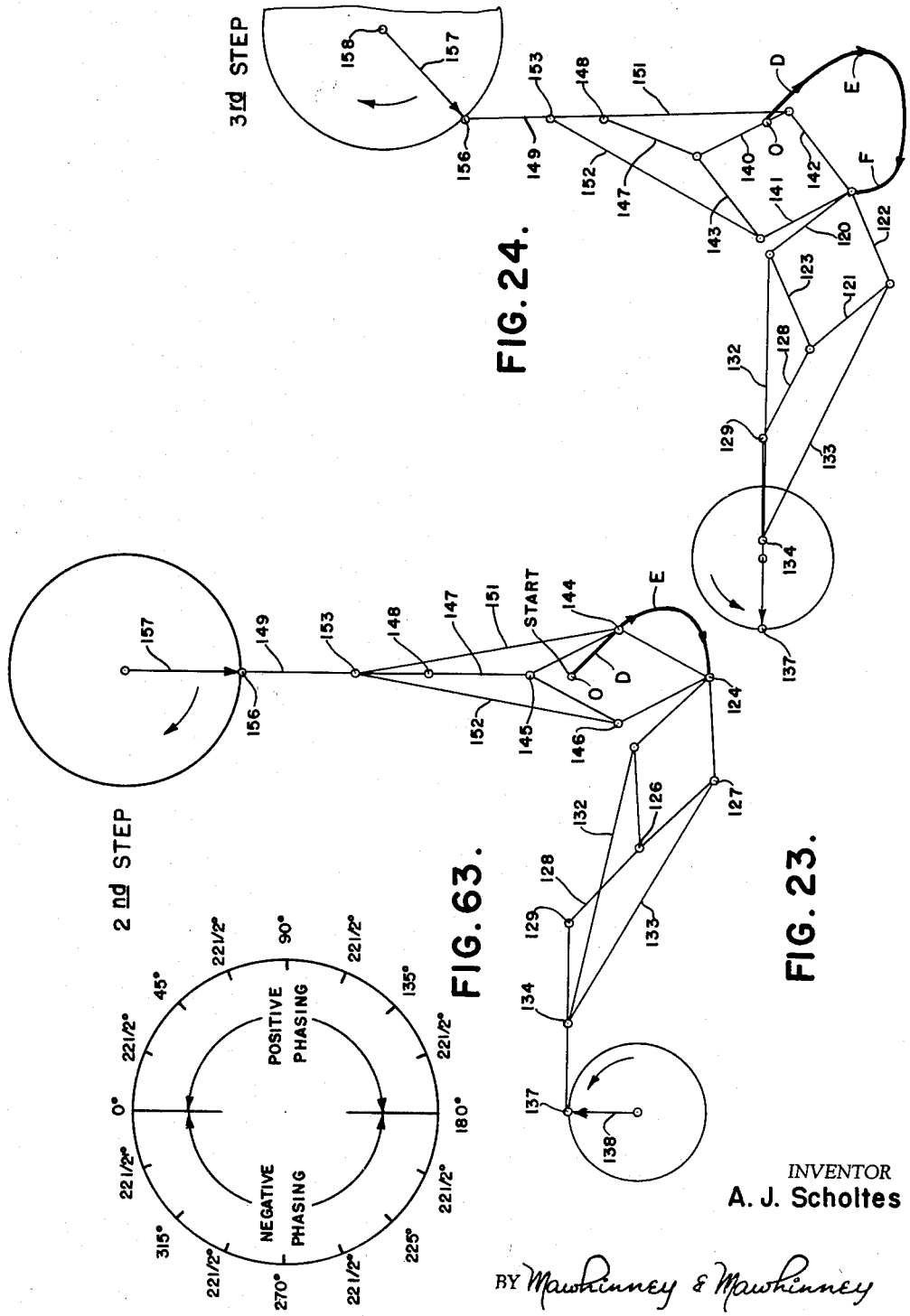

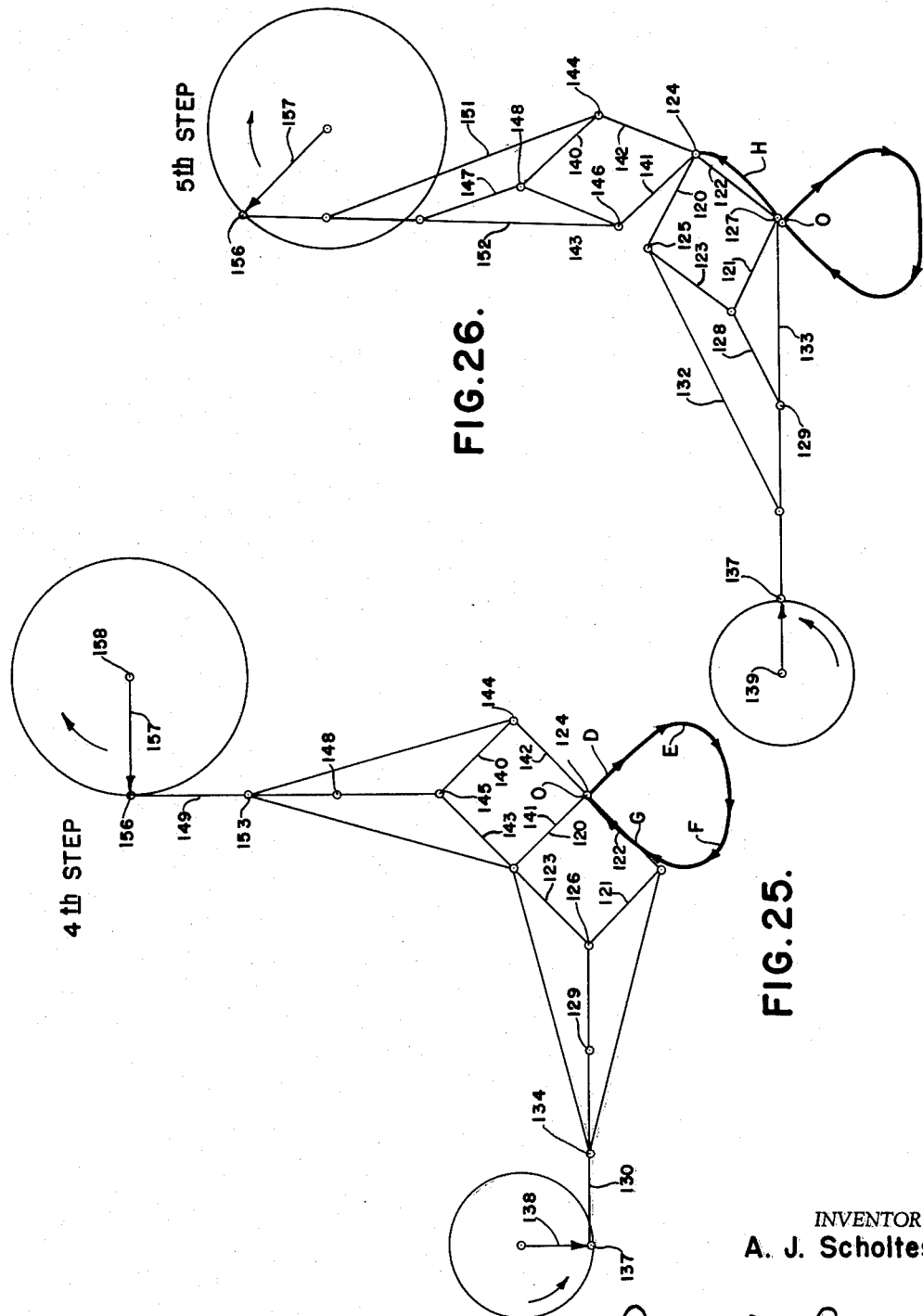

July 4, 1961

A. J. SCHOLTES 2,990,720

MECHANICAL MOVEMENT

Filed March 17, 1960

INVENTOR
A. J. Scholtes

BY Mawhinney & Mawhinney
ATTORNEYS

July 4, 1961  A. J. SCHOLTES  2,990,720
MECHANICAL MOVEMENT
Filed March 17, 1960  17 Sheets-Sheet 14
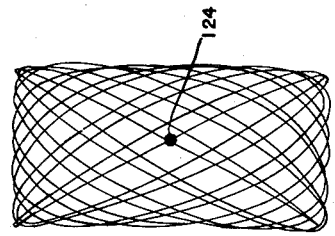
FIG.33.  FIG.32.
R.P.C. 12 RATIO 1-1 1/11
44-48 at 0°
BALANCED
R.P.C. 12 RATIO 1-1 1/11
44-48 at 90°
FULL UNBALANCED
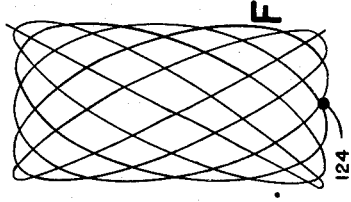
FIG.31.
R.P.C. 1 RATIO 1-1
48-48 at 90°
BALANCED
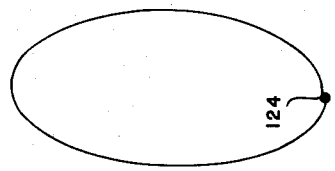
FIG.30.
REVOLUTIONS PER CYCLE 1
RATIO 1-1 48-48 at 0°
FULL UNBALANCED
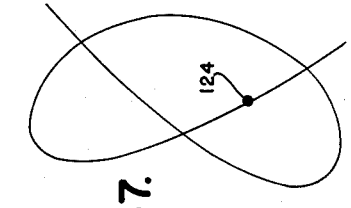
FIG.37.
R.P.C. 4 RATIO 1 1/3-1
36-48 at 22 1/2°
FULL UNBALANCED
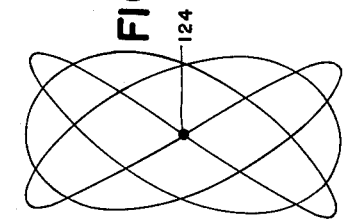
FIG.36.
R.P.C. 4 RATIO 1 1/3-1
36-48 at 0°
BALANCED
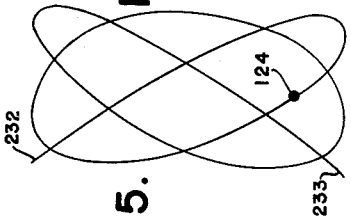
FIG.35.
R.P.C. 6 RATIO 1 1/5-1
40-48 at 45°
FULL UNBALANCED
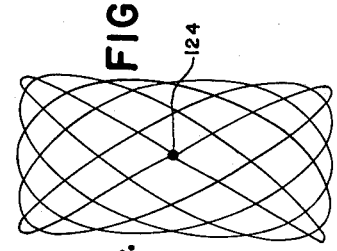
FIG.34.
R.P.C. 6 RATIO 1 1/5-1
40-48 at 0°
BALANCED
INVENTOR
A. J. Scholtes
BY Mawhinney & Mawhinney
ATTORNEYS July 4, 1961 A. J. SCHOLTES 2,990,720
MECHANICAL MOVEMENT Filed March 17, 1960 17 Sheets-Sheet 15

R.P.C. 24 RATIO 1 11/3—1
26—48 at 45°
BALANCED

R.P.C. 12 RATIO 1 5/7—1
28—48 at 0°
BALANCED

R.P.C. 24 RATIO 1 11/3—1
26—48 at 0°
BALANCED

R.P.C. 8 RATIO 1 9/15—1
30—48 at 0°
BALANCED

R.P.C. 12 RATIO 1 5/7—1
28—48 at 22 1/2°
UNBALANCED

R.P.C. 3 RATIO 1 1/2—1
32—48 at 90°
FULL UNBALANCED

R.P.C. 3 RATIO 1 1/2—1
32—48 at 0°
BALANCED

INVENTOR
A. J. Scholtes

BY Mawhinney & Mawhinney
ATTORNEYS

July 4, 1961    A. J. SCHOLTES    2,990,720
MECHANICAL MOVEMENT
Filed March 17, 1960    17 Sheets-Sheet 16
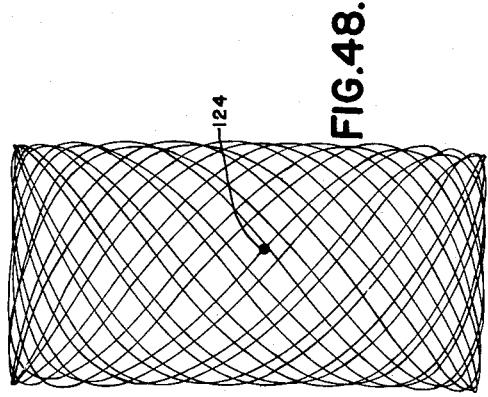
FIG.48.
R.P.C. 24 RATIO 1 2/11-1
22-48 at 0°
BALANCED
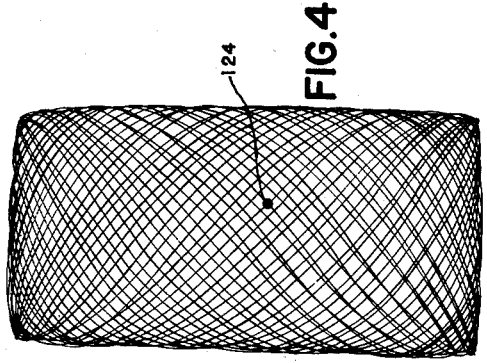
FIG.47.
R.P.C. 48 RATIO 2 2/23-1
23-48 at 0°
BALANCED
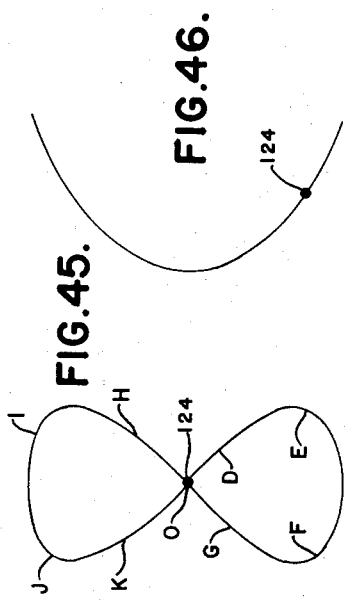
FIG.45.
FIG.46.
R.P.C. 2 RATIO 2-1
24-48 at 45°
FULL UNBALANCED
R.P.C. 2 RATIO 2-1
24-48 at 0°
BALANCED
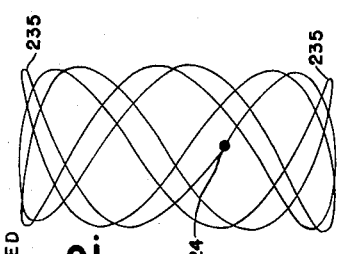
FIG.52.
R.P.C. 8 RATIO 2 2/3-1
18-48 at 22 1/2°
1/2 UNBALANCED POSITIVE
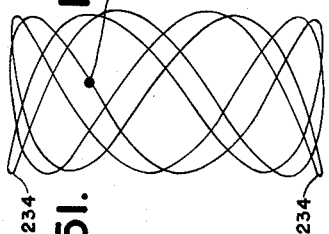
FIG.51.
R.P.C. 8 RATIO 2 2/3-1
18-48 at 22 1/2°
1/2 UNBALANCED NEGATIVE
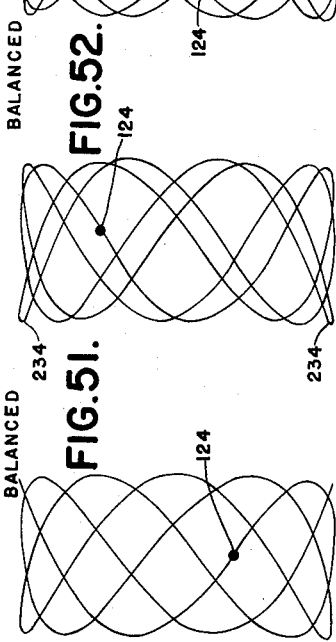
FIG.50.
R.P.C. 12 RATIO 1 2/5-1
20-48 at 22 1/2°
FULL UNBALANCED
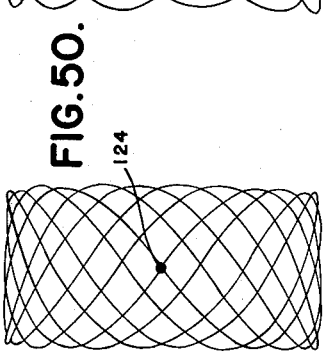
FIG.49.
R.P.C. 12 RATIO 2 2/5-1
20-48 at 0°
BALANCED
INVENTOR
A. J. Scholtes
BY *Mawhinney & Mawhinney*
ATTORNEYS July 4, 1961
A. J. SCHOLTES
2,990,720
MECHANICAL MOVEMENT
Filed March 17, 1960
17 Sheets-Sheet 17
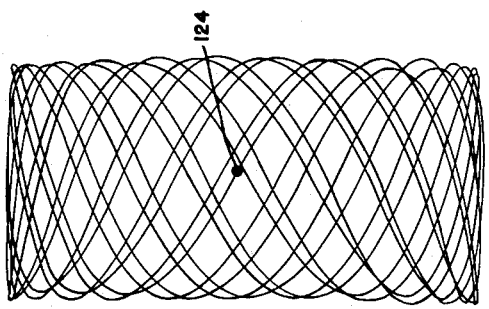
FIG. 57.
R.P.C. 24 RATIO 3 3/7-1
14-48 at 0°
BALANCED
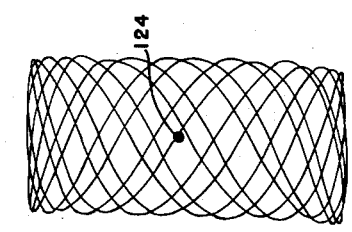
FIG. 56.
R.P.C. 16 RATIO 3 1/5-1
15-48 at 45°
BALANCED
FIG. 55.
R.P.C. 16 RATIO 3 1/5-1
15-48 at 0°
BALANCED
FIG. 54.
R.P.C. 3 RATIO 3-1
16-48 at 90°
BALANCED
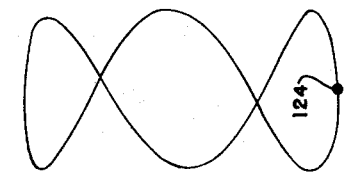
FIG.53.
R.P.C. 3 RATIO 3-1
16-48 at 0°
FULL UNBALANCED
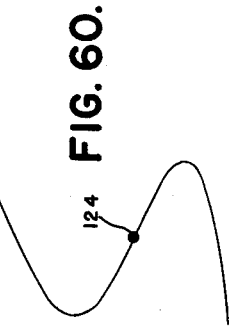
FIG. 60.
R.P.C. 12 RATIO 4-1
12-48 at 22 1/2°
FULL UNBALANCED
FIG. 59.
R.P.C. 12 RATIO 4-1
12-48 at 0°
BALANCED
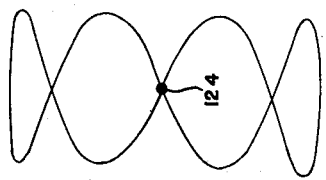
FIG. 58.
R.P.C. 24 RATIO 3 3/7-1
14-48 at 90°
BALANCED
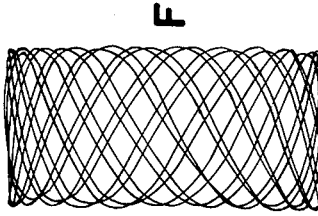
INVENTOR
A. J. Scholtes
BY *Mawhinney & Mawhinney*
ATTORNEYS

United States Patent Office 2,990,720
Patented July 4, 1961

2,990,720
MECHANICAL MOVEMENT
Albert J. Scholtes, 714 Ohio Ave., Corpus Christi, Tex.
Filed Mar. 17, 1960, Ser. No. 16,903
10 Claims. (Cl. 74—86)

The present invention relates to mechanical movement and is a continuation-in-part of my co-pending application Serial No. 726,150, filed April 3, 1958, now abandoned and has for an object to impose on an element or applicator carried by the free end of a post, which is mounted at its other end for universal movement, a compound motion as of the orbit of the third Lissajou's figure, useful for applicators of various kinds in many special applications.

For instance, the invention may be used and employed in a therapeutic muscle developing and massaging machine in which case the applicator will be in the form of a massage pad; or the applicator may be in the form of a paddle or stirrer for use in stirring paints and the like: also to impart to an element of any kind, incessant circulatory motion reversing alternately its rotation of travel, through the path of its orbit.

It is another object of the invention to superimpose upon the post a gyratory motion, preferably symmetrical, following the pattern of a figure 8 or the third Lissajou's figure.

A further object of the invention is to provide an additional movement, desirable in some of its many applications, which will, in addition to the gyratory movement, also simultaneously impose on the post or element an oscillatory motion.

It is a still further object of the invention to provide a machine which will, in addition to the gyratory and oscillatory motions, also superimpose upon an applicator mounted to the free end portion of the post a tilting action in which the applicator is constantly undergoing planar changes throughout its cycle of operations.

In connection with the use of the invention in a therapeutic environment, the motion of the applicator will be effective not only to massage local areas of the human body but also to stretch and redevelop depreciated muscles contributing to general improvement in bodily tone and correction of stature. This is being done in this machine, by following closely the natural movement of the body as provided by nature, namely, a natural body speed, along with a movement which does not rotate continuously in one direction, but reverses its rotation alternatively, but still being circulatory in action, as in the path of the orbit of the third Lissajou's figure which is that of the figure eight. In such a movement, the muscle tissue of the body cannot be injured, as would occur in any movement having continuous rotation in one direction. Adding to this novel motion, an oscillatory motion timed to take place on the curves of the orbit of travel, a perfect body rhythm is thereby produced, bringing all the muscles into rhythmic action at one time, as produced by an Egyptian muscle dance. In the operation of this movement there is also provided the tilting action, combined with all the other movements, therefore providing motion to the body in all possible directions simultaneously.

A still further object of the invention is to provide a machine having convergent forces concentrating upon a tool, scriber, or other implement or post, a resultant movement being the components of the convergent forces which may differ in value including means for adjusting such value differences whereby the implement may be caused to follow a preselected path of a right line or curvilinear character.

A still further object of the invention is to realize such convergent forces in the form of rotating shafts and connected pitman motions driven by the shafts and connected to the implement and wherein the shafts are subject to differential rates of rotation controllable selectively by a novel form of gear ratio mechanism.

A still further object of the invention is to provide in connection with the shafts pitman motions having differential throws whereby the character or the resultant movement impressed upon the implement may be regulated.

A still further object of the invention is to incorporate in the device two interconnected Peaucellier mechanisms, one for each of the convergent forces for generating an exact straight-line motion by the action of its links connected in pairs in a substantially parallelogram association and which through variations in motions of the associated parts including the differentially acting shafts may selectively impart to the implement an infinite variety of curvilinear motions.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a perspective view of a mechanical movement in accordance with the present invention with parts broken away for clearness.

FIGURE 2 is a sectional view taken on the line 2—2 of FIGURE 1.

FIGURE 5 is an end elevational view of the mechanism taken from the end opposite that shown in FIGURE 3 and illustrating the upper portion of the post as broken away.

FIGURE 5ᵃ is a fragmentary vertical section taken on an enlarged scale on the line 5ᵃ—5ᵃ of FIGURE 5.

FIGURE 6 is a side elevational view of the mechanism showing the post partly broken away and the base in section.

FIGURE 7 is a side elevational view taken from the side opposite that shown in FIGURE 6 with the post broken away and the base in section.

FIGURE 8 is a vertical sectional view taken on an enlarged scale through the base universal mounting of the post.

FIGURE 8 is an exploded vertial sectional view of the rubber disc and grommet in normal expanded condition.

FIGURE 9 is a fragmentary sectional view taken on an enlarged scale through the telescopic post sections showing a form of connection of the pitman.

FIGURE 10 shows a detail partly in elevation and partly in section of the oscillator arm.

FIGURE 11 is a diagram showing the pattern of movement of the element or applicator.

FIGURE 12 is a fragmentary vertical sectional view with parts illustrated in elevation of a modified form of device illustrating a one-piece post.

FIGURE 13 is a similar view showing the application of the motion to a washing machine.

Figures 3, 4:
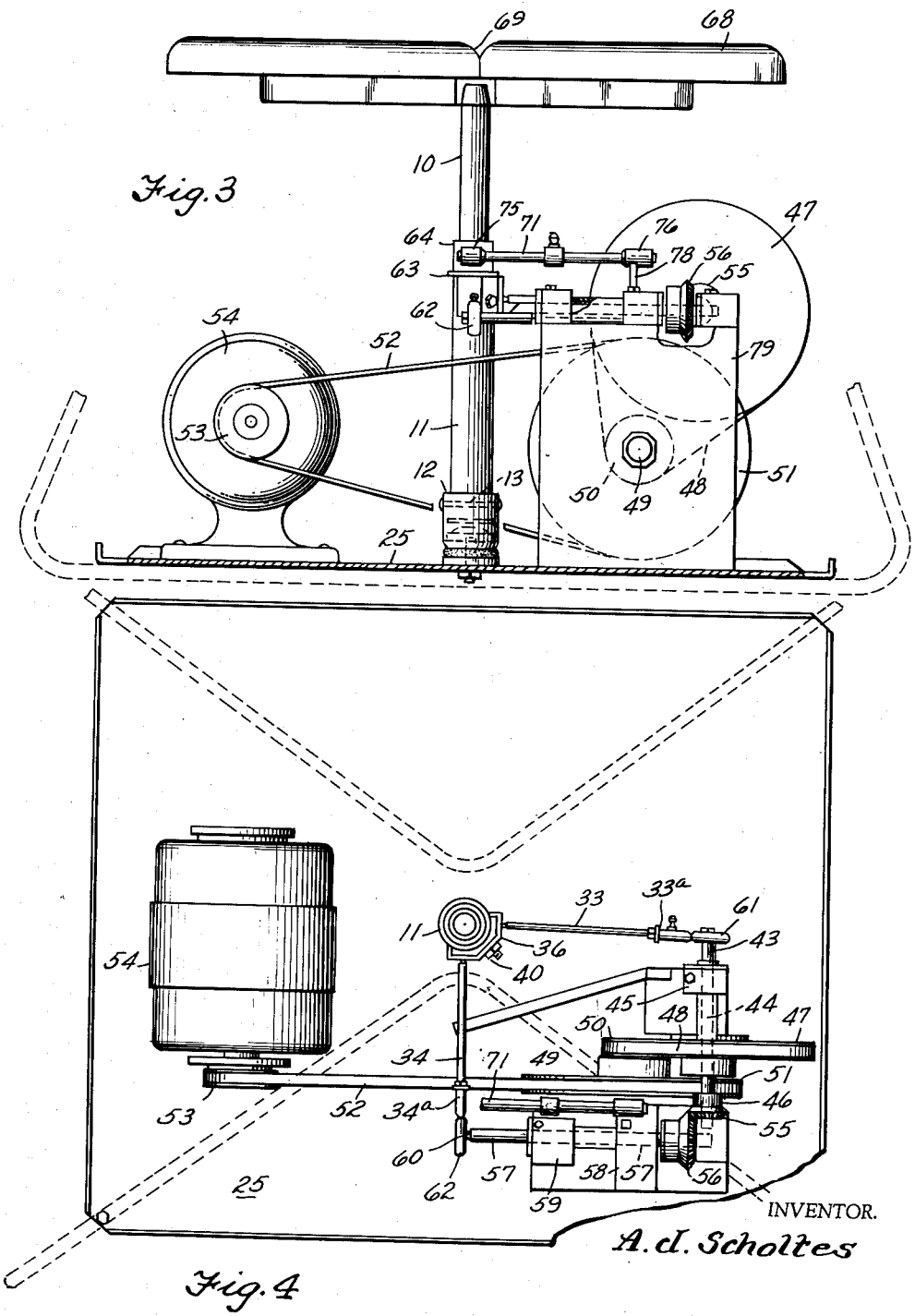
FIGURE 3 is an end elevational view of the device with the cover removed and the base illustrated in section.
FIGURE 4 is a top plan view of the mechanism with the cover and applicator pad removed.
Figure 14:
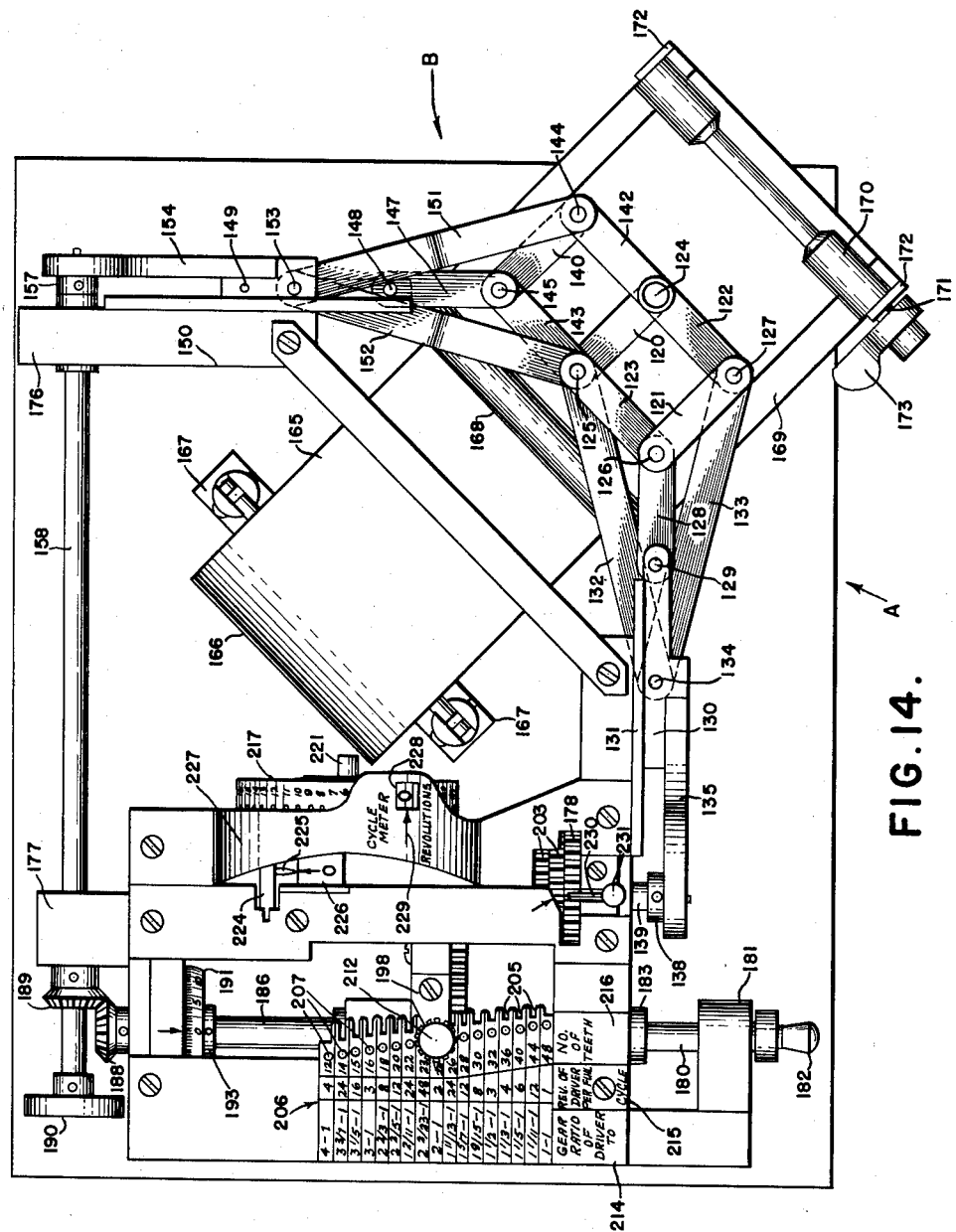

FIGURE 14 is a top plan view of a modified form of a machine for mechanical movement constructed in accordance with the present invention.

FIGURE 15 is a front elevational view taken of the machine of FIGURE 14 taken in the direction of the arrow A of FIGURE 14.

FIGURE 16 is an end elevational view taken in the direction of the arrow B of FIGURE 14.

FIGURE 17 is a top plan view with parts removed and parts shown in section illustrating the two shaft and pitman motions together with the selective gear ratio mechanism.

FIGURE 18 is a similar view showing follower positions of the parts.

FIGURE 19 is a vertical sectional view taken on the line 19—19 of FIGURE 17 and illustrating a disengaged position of the selective gear mechanism to which the same is moved prior to making a gear change.

FIGURE 20 is a similar view showing the drive in engaged position of the gears after adjustment to a selected gear ratio.

FIGURE 21 is a plan diagram or schematic illustrating a neutral or initial position of the mechanical movement.

FIGURES 22 through 29 are similar views showing progression of the movements of the machine for describing a figure 8.

FIGURES 30 through 60 are graphs showing typical examples of patterns capable of being traced by the gyratory movement of the post or implement.

FIGURE 61 is a vertical sectional view taken on an enlarged scale on the line 61—61 of FIGURE 15 with the scriber elevated above the bushing which forms the vertex or pivotal connection between the two Peaucellier mechanisms.

FIGURE 62 is a longitudinal sectional view taken on the line 62—62 in FIGURE 17.

FIGURE 63 is a diagram showing the positive and negative phasing.

Figure 64:
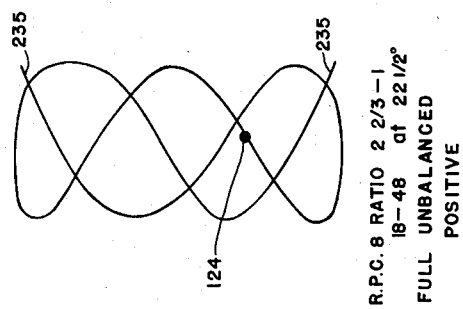

FIGURE 64 is a graph being the positive phasing of complemental FIGURE 52.

Referring more particularly to the drawings, 10 designates an upper section of a post which is telescoped and rotatable in a lower section 11 of the post. In other words, the two sections 10 and 11 constitute the post.

The lower end portion of the lower section is fitted into a bearing collar 12 and secured therein by a cross pin 13. The bearing collar 12 is on the upper end of a shell 14 having a lower flanged end 15 which projects inwardly.

A plate 16 is arranged to close the lower end of the lower section 11 of the post and to rest upon a disc 17 of live rubber which is located above the enlarged head 18 of a step or carriage bolt 19.

A liver rubber grommet 20 is provided with a hole 21 for receiving the shank of the bolt 19. The grommet 20 is formed with a reduced lower end 22 which provides a shoulder 23 for taking against the lower flanged end 15 of the shell 14.

A compression disc 24 is provided with a threaded opening corresponding to the threads on the shank of the carriage bolt 19 and said disc is adapted to be rotated on the bolt to move the disc up against the lower end 22 of the grommet 20.

A base 25 or support member is provided with a performation to receive the shank of the carriage bolt 19 and a lock spider washer 26 is fitted over the shank of the bolt below the base 25. A nut 27 is also threaded on the bolt 19 below the washer 26, which nut is tightend up against the washer. The bolt 19 has a square section 28 closely engaged by the grommet 20 to prevent rotation of the bolt when the nut 27 is tightened.

The above construction forms a universal, yieldable and noiseless mounting for the post 10, 11 and the upper end of the post may have a gyratory motion about the support.

The mechanism for imparting this gyratory motion to the upper end of the post 10, 11, in the single embodiment of the invention illustrated in the drawings, comprises pitman rods 33 and 34 convergently disposed with respect to one another, angularly displaced from one another with reference to the axis of the post at an angle of substantially ninety degrees and coinciding with radii of the post in the origin, rest or neutral upright position of the post as shown in FIGURE 9. The convergent or inner ends of the rods 33, 34 have universal balls 31, 32 fitted in part-spherical sockets 29, 30 in the post section 11. The pitman rods 33, 34 include turnbuckles 33ª, 34ª for the purpose of adjusting the lengths thereof.

The pitman rods 33, 34 are held in place by a confining plate 36 which also holds absorbent lubricating pad 35 about the joints 31, 32. A stud 37 passes through the pad 35 and plate 36 and is threaded into a threaded opening 38 in the lower post section 11. A lock nut 39 is also threaded on the stud and binds against the post section 11. The bolt head 40 of the stud 37 engages the outer side of the confining plate 36 to urge the plate against the ball ends 31 and 32, to hold assembly into the ball sockets 29 and 30. Openings 41 and 42 are made in the plate 36, such openings being wider than the pitman cross-sections to allow freedom of movement of the pitman therein.

The pitman 33 is connected at its outer end and driven by a universal bearing crank 43 made fast on a fast shaft 44 journalled in bearings 45 and 46.

A large V-belt pulley 47 is fast on the fast shaft 44 and is engaged by a V-belt 48. The belt 48 is engaged with a small diameter pulley 50 loose on an idle bearing shaft 49. Also idle on the shaft 49 is a large pulley 51, the pulleys 50 and 51 being fastened together into one unit so that the large pulley drives the small pulley and through the belt 48 drives the fast shaft 44.

The large pulley 51 is engaged by a drive belt 52 driven from a small pulley 53 on the armature shaft of an electric motor 54 installed on the base 25.

A small bevel pinion 55 is fast on the fast shaft 44 and is in mesh with a large bevel pinion 56 fast on a slow shaft 57 journalled in bearings 58 and 59. The slow shaft 57 has a crank 60 fast thereon connected universally to drive the pitman rod 34. Spherical rod and bearings 61 and 62 on the pitman rods engage the cranks 43 and 60 allowing for universal movement of the pitman rods on the cranks.

A thrust washer 63 on the upper post section 10 rests on the upper end of the lower post section 11. A collar 64 disposed above the thrust washer 63 is made fast to the upper post section 10.

In the lower part of upper post section 10 which is housed within the lower post section 11, is a circular groove 65 engaged by the dog end of a threaded set screw 66 which is threaded through the lower post section 11. Thus the upper post section 10 may rotate with respect to the lower post section 11 but the engagement of the dog end 67 in the circular groove 65 will prevent casual or accidental upward movement or disengagement of the upper post section 10 from the lower post section 11 and to hold it into assembly.

Carried by the upper end of the upper post section 10 is an applicator 68. This applicator may be in the form of a round massage pad, in the form of a stirrer or paddle where the device is used, for instance, in mixing paints and the like, or other form of applicator.

Where the applicator is a massage pad, the same will preferably be provided with a groove 69 to divide the pad into two sections, so each section of the pad can act on the muscles of the back, without causing undue friction to the spine itself, during oscillation. The groove is to be placed in registry and alignment with the human spine.

In addition to the gyratory movement imparted to the upper portion of the post and applicator 68, the same may be given a rotary or oscillatory motion in which the upper post section 10 moves angularly or rotates about the non-rotary lower post section 11.

In the instance illustrated this motion may be achieved by an oscillation producing device comprising an oscillator arm 70 and an oscillator link 71. The oscillator arm at its inner end is fixedly connected to the upper post section 10. For instance, a threaded end of the oscillator arm 70 is threaded into threaded holes in the collar 64 and upper post section 10 at a point, running in axial line with the groove 69 of the applicator 68. Thus the oscillator arm is rigidly connected to the upper post section 10. The oscillator arm contains an integral shoulder 73 or a nut pinned to the arm 70 so as to bind against the collar 72.

At its outer end the oscillator arm 70 carries a ball 74 to fit in a universal socket 75 in one end of the link 71, the ball and socket constituting a universal joint. At its other end the link is provided with a universal socket 76 to receive a ball 77 on a bracket 78 mounted on the frame 79. The link 71 extends at right angle to an axis line, which extends through the point of tangent of the two loops, and through the loops, which represent the orbit of travel of the post.

In assembling the device, before the lower post section 11 is assembled to the bearing collar 12 and while the upper end of the collar 12 is open, the shank of the carriage bolt 19 is first inserted through the hole 21 in the grommet 20; thereupon the combined carriage bolt and grommet are dropped through the upper end of the collar 12 until the shoulder 23 comes to rest on the flange 15 of the shell 14. The rubber disc 17 is then dropped on top of the bolt head 18, followed by dropping the metal disc 16 on the rubber disc 17. Thereupon the lower end of the post section 11 is entered into the collar 12 and the cross pin 13 inserted.

The compression disc 24 is then threaded on the bolt 19 and is run upwardly thereon to compress the rubber grommet 20 and the rubber disc 17 around the bolt head 18 and around the square section 28 of such bolt. This squeezing of the rubber disc 17 and grommet 20 causes the same to bulge outwardly against the shell to close all voids.

In this action the lower reduced end 22 is also deformed and the inherent elasticity causes the surplus rubber to flow out beneath the flange 15. The body of rubber is held under compression within the shell and about the square or other straight line section 28 which resists axial turning movement of the bolt 19 but forms an elastic bearing permitting the post sections to have a universal or gyratory movement.

In operation, the pitman rods 33 and 34 are preferably at right angles to one another, that is, separated by ninety degrees as this angular distance is desirable in order to register a perfect symmetrical pattern in the gyratory movement of the upper end of the post carrying the applicator. The pattern referred to herein is an 8-figure path described by the upper end of the post or the third Lissajou's figure.

The fast and slow shafts 44 and 57 are preferably also at right angles to one another and to their respective pitman rods 33, 34.

Viewing FIGURE 11, when the post 10 is in neutral position, that is, absolutely vertical; otherwise stated, at the point of tangency between the two loops of the 8-figure pattern the axis line of which passes through the loops. The fast and slow shafts 44 and 57 and the points of connection between the pitman rods and the post should preferably all be in the same common plane, in this case in the same horizontal plane.

Where the axes of the fast and slow shafts are in the same plane with the points of connection referred to, the cranks will rise above the plane the same distance as they will descend below this plane so that the axes of the pitman rods form with the points of connection with the post the same angles in the upper and lower positions of the cranks, this being necessary to form a uniform pattern otherwise the loops of the pattern will be distorted and not symmetrical.

The pitman rods and shafts form a closed square having equal sides, which is also necessary if the pattern is to be symmetrical as to both loops.

To synchronize the pattern as to both loops it is also absolutely necessary that the gear ratio be 2–1. In a successful form of the invention the small pinion 55 has fourteen teeth to twenty-eight teeth of the large pinion 56. Any other absolute 2–1 ratio will secure the same effect.

The crank 43 on the fast shaft 44, for an example as shown here, is 23/64 inch off center, allowing for a total crank throw of 23/32 inch travel of the pitman 33, while the crank 60 on the slow shaft 57 is set at 23/32 inch off center, allowing for a total crank throw of 1 7/16 inches of travel of the pitman 34, and while the shafts 44 and 57 differ in just exactly one half of the speed, the travel of the slow pitman 34 on one half a revolution of the slow crank 60 would equal the same distance of travel of the fast pitman 33 during a full revolution of the fast crank 43. Therefore, both pitmans start with a pushing motion to the right, while on the second half revolution of the slow crank 60, the pitmans start with a pushing motion to the left; in this way they form both loops of the figure 8, but the direction of travel for each loop is opposite.

This reversal of travel while still being a continuous circulatory motion is the new and novel feature of this invention.

While in this instance the off center of the cranks are two to one ratio for the purpose herein of securing the most perfect symmetrical pattern in the orbit of the figure eight or third Lissajou's figure, nevertheless any combination of off center may be employed to the cranks to vary the pattern of the orbit of figure, from a long and narrow figure eight to a wide and short figure eight, neither of which would be symmetrical, but would still be desirable in certain other applications of this novel movement employed in other uses.

The reason for the absolute 2 to 1 gear ratio on the shafts is to maintain the same ratio of speed to the shafts. Therefore, should one gear have one or more teeth than the other on this 2 to 1 ratio, the result would be a constant change in the relationship of the travel of the pitmans to each other, whereby the pattern of the orbit could not be controlled by the setting of the off center of the two cranks with relation to each other.

The cranks can be made adjustable as to the extent of throw, so the distance of travel of the pitmans can be changed.

Referring more particularly to FIGURE 11 showing diagrammatically the symmetrical double looped pattern arrangement, assuming that the post 10 is in neutral position, that is, with its axis vertical, which neutral position is indicated at 0, the two cranks will then be in the uppermost position. The slow crank and pitman, and oscillator arm have the same line of axis through the two loops. On its first quarter turn the fast crank pushes the post from 0 to A, aided of course by the complementary movement of the slow crank, the movement of which will be described below.

In other words the fast crank goes ¼ turn from neutral 0 to A on a push; then from A to B on a pull and from B to C on a pull. Then, from C to 0 on a push, completing the revolution of the crank and bringing the same again to the uppermost position, while the slow crank is in a lowermost position.

Meanwhile, the slow crank, with twice the throw of the fast crank moves ⅛ turn from 0 to A on a push and from A to B (second ⅛ turn) on another or continuing push; then from B to C on a pull (⅛ turn) and from C to 0 on a pull (⅛ further turn) completing one-half revolution, placing it in the lowermost position.

Having completed loop 1 the post has been returned to neutral position 0 and the fast crank is in the uppermost position and the slow crank in the lowermost position. The fast crank is therefore ready for another push which is responsible for reversing the direction of movement in loop 2. At the same time the slow crank is still on pull so that the upper end of the post or applicator is moved in the second loop from 0 to a, at which time the fast crank has moved from top position ¼ turn and is ready to go into a return pull in its second quarter turn from *a* to *b*. At the same time the slow crank is still pulling during its second ⅛ turn from *a* to *b*.

Thereupon the fast crank pulls back from *b* to *c* while slow crank is now pushing from *b* to *c*.

Fast crank, on last quarter turn push moves the upper end of the post from *c* to 0 and the slow crank likewise pushes from *c* to 0 back to neutral position, this constitutes a complete cycle of pad post through the figure 8, and completes the cycle in which fast crank has made two complete revolutions to a single revolution of the slow crank. In other words the fast crank has made a complete revolution for each loop of the pattern and the slow crank only one-half revolution for each loop. A cycle is defined as going through both loops, completing the pattern of a figure 8 or the third Lissajou's figure, on a horizontal plane and a recording taken in the perpendicular off the top of the pad post would again describe another figure eight or third Lissajou's figure, thus this figure of its orbit of travel is both horizontal and perpendicular when the tilting movement is used along with the horizontal movement.

The greater throw of the slow crank enables it to traverse the same distance in ⅛ turn as does the fast crank in ¼ turn. The two crank motions are two components of motion simultaneously imposed on the post to gyrate the same in the pattern of a figure 8.

The oscillatory motion is added to the gyratory movement especially when used as a therapeutic device. The applicator 68 is mounted on the upper post section 10 and is given an oscillating motion acting in rhythm with the gyratory movement to impart a complete rhythmatic motion to the human body of the patient as provided by nature along with a cycle speed coinciding with that of nature.

Now referring to FIGURE 11 showing diagrammatically the symmetrical double looped pattern arrangement, and facing the line of axis through the two loops, and along the groove of the applicator 68, and assuming that the post is in neutral position at 0, and the path of travel be clockwise entering the far loop from the point 0, the oscillation would rotate to the left and reach its maximum at the point A along the path of the loop, then reversing rotation and returning to line of axis at the point B, then rotating to the right to the point C, then reversing and rotating back to the line of axis at the point 0, completing the path through the far loop and completing two oscillations. Now with the gyratory motion entering the path of the near loop in a counterclockwise direction of travel along the path of the near loop the oscillation is to the left when the point *a* is reached, at which point it reverses rotation back to the line of axis at the point *b*, then the oscillation is to the right up to the point *c* at which point it again reverses rotation back to the line of axis and the point 0, completing a full cycle of the gyratory motion and four complete oscillations.

Now it is seen that the oscillator arm 70 is rigid to the post 10 at one end and its other end extending toward the near loop and along the line of axis, and at which end the link 71 extends from, to the right and at right angle to the line of axis and having its end movably anchored to the frame 79, thus the link acts as a tie to the end of the arm 70 holding its end substantially in line with the axis of the loops, and its other end extending to the post 10, and again assuming the post to be at 0 on the line of axis and moves along the path of the far loop clockwise, or to the left of the line of axis the arm 70 causes a rotation to the applicator to the left until the point A has been reached on path of the loop, then bearing to the right along the path of the loop to the point B which is also on the line of axis, thereby causing a reversing rotation to the applicator to the right to the center point of such oscillation. This should make the successive oscillations clear as the gyratory movement passes through a complete cycle along the path of the figure eight or third Lissajou's figure.

The extent of oscillation is controlled by the length of the oscillator arm 70, decreasing length increases the amount of oscillation, however the link 71 should always extend away from the arm at right angle, in order to secure the same amount of oscillation in both loops. While there is a slight error in the oscillation at the points B and *b*, it can be minimized by providing the longest link 71 possible and still be able to anchor its end on the frame 79 at a point 90° from the end of the arm.

Additionally, there is also imparted to the applicator as an incident to the gyratory movement, a rocking movement of the plane of the pad or paddle or other form of applicator so that in effect there are three movements superimposed upon the applicator simultaneously.

In the application of this new movement for other uses, it may be desirable to omit one or both the oscillating and tilting or rocking motions, and employ only the gyratory movement. The oscillatory motion is omitted by clamping both sections of the pad post into one, and removing the oscillating arm from the post. The tilting or rocking motion can be discontinued by freeing the lower end of the pad post, and adding means to maintain both ends in a perpendicular position, while being acted upon by the two pitmans, or the entire removal of the pad post, and securing the ends of the pitmans in position for universal movement to each other, and allowing the ends of the pitmans to act upon any other form of element or matter, to impart an orbit of the third Lissajou's figure of motion thereto. Therefore, it is evident that many modifications can be had in the application of this movement to an object or element, without resorting to any form of cam track to direct the motion, as the two cranks can be made adjustable in many combinations, as to the amount of throws and distance of travel imparted on the pitmans, all such modifications could be had without departing from the scope of this novel movement.

Therefore it is evident that in certain applications of this movement it may be desirable to depart from the strict 2-to-1 ratio on the gears to control the pattern in the use shown, and employ other combinations of odd teeth to the gears, whereby the pattern would change after each cycle, until the same tooth of one of the gears would return to the same arc of recess adjoining a mating tooth of the companion gear at which instance the same pattern would be had, as at the start of the first cycle of movement.

In the course of its gyrations the post will swing toward and away from the oscillator link 71 with the outer end of the rigid oscillator arm 70 bowing down and then lifting up. The link 71 will follow these movements of the arm 70 by swinging down and up and out and in about the universal joint 76, 77. Corresponding movement will occur at the universal joint 74, 75 at which point the thrust of the arm 70 is applied to the link 71. The gyratory motion imposed on the post by pitman 33 will also require the post to swing back and forth generally longitudinally of the link 71. Owing to the rigid attachment of the arm 70 to the link 71 this movement will place a restraint on the movement of the arm in both directions. When the limit of movement of the arm 70 has been reached in either direction and the arm 70 arrested in motion while the post continues its movement the reaction will cause the upper post section 10 to undergo small increments of angular or rotary movement which is imparted to the element or pad 68 in the form of small periodic oscillations.

FIGURE 5ᵃ illustrates a manner of interfitting together the two post sections 10, 11 with the set screw 66 threaded in post section 11 and entered at its inner end into the annular groove of the telescoped end of upper post section 10. The washer 63 is shown between the upper end of lower post section 11 and the collar 64 which is made fast to the upper post section 10 by the set screw 64ᵃ. The connection of oscillator arm 70 to the post sections is also illustrated.

FIGURE 12 illustrates a modification in which the post 10ª is a single tube from top to bottom. The lower end 90 may be of round section to gyrate on a universal ball 91 held to the base 25 by a screw 92. A universal sleeve 93 fitted for universal movement on the ball 91 is screw threaded or otherwise connected to the post 10ª. An oil hole 94 is made through the post wall below a cork or other stopper 95. The space 96 below the stopper may be filled with felt or some oil absorbent material to maintain a constant supply of lubricant at the universal joint. The ball ends 32ª of the pitman 33, 34 are received in sockets 30ª of the tube or post 10ª and confined by universal socket pieces 97 fitting loosely about the pitman and attached to the tube by screws 98 or other fastenings.

In this instance the oscillator arm 70 has a reduced end section 99 entered through opposite walls of the tube 10ª with a shoulder 100 on the arm side and a nut 101 threaded on the free end.

In FIGURE 13 the invention is shown applied to a washing machine in which the walls of the tub are indicated at 102 and the pad or agitator at 103. In this instance the post or tube 10ᵇ is supported centrally or intermediate its ends by the universal ball 104 affixed to the post and the sectional universal socket piece 105 supported by arms 106 or a spider from the walls 102. The pitman 33, 34 are attached to the lower end of the post.

Referring more particularly to FIGURES 14 to 20, inclusive, and FIGURE 61, links 120, 121, 122 and 123 are arranged in pairs to form a parallelogram linkage of a Peaucellier mechanism, the links being connected at vertex or pivotal points 124, 125, 126 and 127 forming the vertices of the parallelogram.

A central link 128 is pivotally connected to the parallelogram linkage at the vertex 126 at one end, having its other end fulcrumed at 129 upon a reciprocating crosshead or pitman 130 which is slidably mounted in guides 131 on the frame of the machine. The links 120, 121, 122 and 123 and the central link 128 are all preferably of identical length.

Lateral links 132, 133 are respectively pivotally connected to the parallelogram linkage at the vertices 125, 127, from which divergent points the latter links 132, 133 converge to the crosshead where they are fulcrumed on a common pivot 134. The lateral links 132 and 133 are longer than the central link 128 and the fulcrum or pivot 134 is displaced from the fulcrum or pivot 129 in a direction away from the parallelogram linkage.

The crosshead or pitman 130 may be moved back and forth by any desired mechanism, for instance, through the medium of a Scotch yoke 135 (FIGURE 15) affixed to the crosshead 130 and having a slot 136 elongated in the direction normal to the direction of movement of the crosshead. In the slot 136 is fitted for sliding movement a crank pin 137 projecting out from a crank arm 138 affixed to a drive shaft 139.

A second Peaucellier mechanism comprises the parallelogram linkage of links 140, 141, 142 and 143 pivoted together at the vertex points 144, 145, 146 and at the vertex point 124 of the first-named parallelogram linkage, the links 141, 142 being pivoted together at this common vertex 124.

A central link 147 is pivoted at one end to the vertex 145 and its other end upon a pivot or fulcrum 148 to the reciprocating crosshead or pitman 149 mounted to reciprocate in guides 150 on the frame of the machine.

Lateral links 151 and 152 respectively pivoted to the vertex points 144, 146 converge toward the pitman 149 to which they are pivoted at their other ends upon a common pivot or fulcrum 153.

This second Peaucellier mechanism may be driven by any suitable drive means displaced angularly from the drive means for the first-named Peaucellier mechanism. The second Peaucellier mechanism may, for example, be driven by a Scotch yoke 154 affixed to the crosshead 149. The yoke 154 has a slot 155 therein (FIGURE 16) elongated in a direction at substantially right angles to the direction of sliding movement of the crosshead or pitman 149. By comparing FIGURES 15 and 16 it will appear that the slot 155 is of greater length than the slot 136 in the yoke 135. It will also be apparent that the crank pin 156 of FIGURE 16 is carried by a crank arm 157 of greater radial length than that of the crank arm 138 of FIGURE 15. The crank arm 157 is affixed to a drive shaft 158.

By reason of the differences in crank throw between the mechanisms of FIGURES 15 and 16 it will be seen that the second Peaucellier mechanism may be driven back and forth through its yoke 154 through a longer stroke than that of the first-mentioned Peaucellier mechanism through its yoke 135. This differential crank throw varies the timing of the two yokes 135, 154 relatively to one another and also as these yokes are subject to relatively different rates of reciprocation through mechanism hereinafter described the conjoint action of the two Peaucellier mechanisms combine to trace an infinite variety of patterns impressed upon the implement or scriber affixed at the common pivotal vertex 124.

FIGURES 15 and 61 show an implement or scriber 159 for removable mounting at the common vertex 124 through a hollow post bushing or sleeve 160. This bushing 160 forms the pivotal connection between links 122, 120, 142 and 141. The topmost link 122 of the first Peaucellier mechanism supports the bushing through an outturned flange 161 at the upper end of the bushing overlying the link 122. Between the links 122, 120 of the first Peaucellier mechanism and the links 142, 141 of the second Peaucellier mechanism there is preferably a spacing collar 162 and below the link 141 is a removable collar or ring 163 fastened to the bushing 160 as by a set screw 164. Any other form of connection at the common vertex 124 may be employed to hold any type of tool, implement or stylus. This arrangement has been adopted for convenience in a pilot model of the machine which enables a scriber 159 to be readily removed and applied for the purpose of exhibiting the potential of the movement to widely diversified pattern areas which may be traced upon a web of paper 165 or the like which may be drawn out from a roll 166, rotatably mounted in a roll stand 167 mounted on or in conjunction with the framework of the machine, the paper web being carried beneath a roller 168 journalled for rotation adjacent a bed 169 located beneath the scriber 159. The end of the paper web 165 may be drawn out manually across the bed 169 and fresh areas of the web may be thus presented to the scriber. Preferably means will be provided in conjunction with the bed for holding the paper web in a flat and immovable position desirable for accurately tracing the movements of the scriber. For instance in conjunction with the roller 168, a device (not shown) may be provided for locking the roller against rotation, and at the forward or outer end of the bed 169 a roller 170 may be provided with eccentric trunnions 171 mounted rotatably in bearings 172 extending upwardly from the bed, the roller and trunnions being rotatable by a finger piece 173 so that in one angular position the roller may be raised to permit pulling of the paper freely therebeneath and in another angular position the roller may be moved down binding the paper against the bed.

Peaucellier's mechanism is illustrated in the publication entitled "Applied Kinematics," by J. Harland Billings, D. Van Nostrand Company, Inc., New York, New York, third edition—second printing, pages 60, 61, reprinted January 1955.

The sides of each parallelogram should be equal and the side links of each mechanism should be equal. The central link in each case, which is a fixed link, should equal the distance between 129 and 134 in the case of the first mechanism and 148, 153 in the case of the second Peaucellier mechanism. For any possible phase of the mechanisms 124, 126 and 134 of the first mechanism will be in line and 153, 145 and 124 of the second mechanism will be in line. The parallelograms will open and close in conformity with shifting of the same about the centers 129 and 148. The mathematics of this mechanism is set forth in the publication referred to.

The pitman 130 and the pitman 149 are shown in FIGURES 17 and 18 to be disposed in a preferable relationship of 90° displacement so that the two Peaucellier mechanisms entrained therewith are caused to converge upon the implement or scriber, meeting in the vertex 124. While this angular arrangement of mechanisms has been found satisfactory for producing an infinite variety of patterns of movement of the tool or scriber, other angular arrangements are permissible.

According to the modification of the invention shown in FIGURES 14–20 and 61 and 62, the one drive shaft 139 is journalled in frame bearing members 174 and 175 and the second drive shaft 158 is journalled in frame bearing members 176 and 177. The drive shaft 139 may be driven through a gear wheel 178 affixed to the drive shaft 139 and disposed in mesh with a pinion 179 fast on a prime mover shaft 180 journalled in the bearing 174 and a frame bearing 181. This shaft 180 may be connected to any prime mover for the purpose of rotating the same and communicating rotary movement to the drive shaft 139. In the pilot machine a crank handle 182 is used as connected to the outer end of the shaft 180 for the purpose of manually rotating the same. A collar 183 is made fast to the shaft 180 by a set screw 184 in a position which engages the outside wall of the frame bearing member 174 while the pinion 179 is abutted substantially against the other wall of this frame bearing member 174. The inner end of the shaft 180 projects inwardly beyond the pinion 179 and is entered into a counterbore 185 (FIGURE 17) made in the outer or forward end of a counter shaft 186 whereby this outer end of the counter shaft 186 has a bearing upon the inner end of shaft 180 without being entrained to rotate with the shaft 180. In other words the counter shaft 186 is not driven by the prime mover shaft 180 and is free to rotate about the inner end of the shaft 180 without interfering with the relative rotational movements of either shaft. At its inner end the counter shaft is journalled in a frame bearing 187 and projects to the rear of such bearing where it has fixed thereon a bevel pinion 188 disposed in mesh with a bevel pinion 189 affixed to the inner end of a second drive shaft 158. This drive shaft 158 is continued inwardly beyond the bevel gears and receives fixedly thereon a hand wheel 190 for the manual rotation and setting of this drive shaft 158 and the parts entrained therewith.

An index disc 191 is affixed to the counter shaft 186 just forwardly of the frame bearing 187 by means of a set screw 192 entered through the hub 193 of the disc 191.

A keyway 194 axially of the counter shaft 186 receives a key 195 (FIGURES 19, 20 and 62), such key being entered through a slidable sleeve 197 slidably mounted axially on the counter shaft 186. Formed with or attached to the forward end of this sleeve 197 is a slidable follower pinion 196. A rock frame 198 has a circular bearing 199 freely rotatable about the sleeve 197 confined at one end axially by the slidable follower pinion 196 and at the other end by a confining collar 200 affixed against relative axial movement on the sleeve 197 by a set screw 201.

As shown more particularly in FIGURES 19 and 20, the rock frame 198 carries an idler pinion 202 freely rotatable on the rock frame 198 and disposed in constant mesh with the slidable follower pinion 196. As the rocking axis of the frame 198 is about the center of the counter shaft 186, the teeth of the idler pinion 202 will rotate freely on the slidable follower pinion 196 incident to the rocking motion of the frame 198 between the two positions of FIGURES 19 and 20 in which in FIGURE 19 the idler pinion 202 is in the free or disengaged position and in FIGURE 20 in the engaged gear train engagement with a selected one of a series of step drive pinions 203 (FIGURES 16, 17 and 18) affixed to the drive shaft 139.

A narrow web 204 of the rock frame 198, when swung into gear train engaging position, enters a selected one of a series of open slots 205 in a gage plate 206 (FIGURE 14) affixed to the framework of the machine in a position in which the various slots 205 are in substantial alignment with corresponding step drive pinions 203. As these step drive pinions progress step-by-step in diameter from the inner end portion of the drive shaft 139 up to the gear wheel 178, it will require progressively greater angular movement of the rock frame 198 to engage pinions 202 and 203 as the rock frame 198 and its slide sleeve 197 are moved along the counter shaft 186 from the outer toward the inner position step-wise to align its idler pinion 202 with a selected step drive pinion 203. Accordingly, the edge of the gage plate 206 in which the slots 205 are made will be inclined in the manner shown in FIGURE 14. Inwardly of the open slots 205 in the gage plate are perforations 207 for selectively receiving a movable lock rod 208 slidable in spaced lugs 209, 210 on the upper portion of the rock frame 198. A cross pin through an intermediate portion of the lock rod between the lugs 209, 210 will act as a limit stop encountering opposed lugs to retain the rod 208 captive to the rock frame 198. The lock rod 208 is preferably provided with a knurled head 212 between which and the lug 209 is disposed a coil spring 213 wound about the rod and biasing the lower free end of the rod to an upper position withdrawn from the perforations 207. The rod 208 has a friction fit in the perforations 207 and rotary movement of the rod establishes the tight fit of the rod in a registering perforation when the rock frame 198 is in the position of FIGURE 20. The lock rod 208 thus maintains entrainment of the counter shaft 186 with the drive shaft 139 when in the position of FIGURE 20, the rotation rate of the counter shaft 186 being dependent upon the gear ratio established by the position of the sleeve 197 along the counter shaft 186. The sliding movement of the sleeve 197 and its entrained parts including the slidable follower pinion 196 and rock frame 198 is accomplished manually by engagement by the lock rod head 212.

As appears in FIGURE 14, the gage plate 206 is divided into three columns 214, 215 and 216. These columns are subdivided into spaces opposite the various slots 205 and they show in column 214 the various gear ratios of the driver shaft 139 to the follower or driven shaft 186; in column 215 the number of revolutions of the drive shaft 139 per full cycle for tracing given patterns; and in column 216 the number of teeth on the selected step driver pinions 203.

A counter wheel 217 is associated with the drive shaft 139 for counting the revolutions thereof, which wheel is journalled upon a shaft 218 (FIGURE 17) which is journalled in frame bearing 175. Against a face of the wheel 217 is placed a friction disc brake 219 pressed against the side of the disc 219 by a bowed pressure spring 220, the pressure of the spring being regulated by an adjusting head 221 of the shaft 218 which is adjustably threaded into the frame bearing 175.

The counter wheel 217 is provided with a toothed peripheral edge 222 adapted to be engaged by a rotary tooth 223 on a rotating arm 224 affixed to the inner end of the drive shaft 139. This arm 224 also preferably carries a pointer 225 movable past a zero index 226 marked off on a frame part, as shown more particularly in FIGURE 14.

In this FIGURE 14 is also illustrated a casing part 227, at least partially enveloping the peripheral edge of the counter 217, on which latter are displayed numbers in an arithmetical sequence adapted to pass within a window 228 in the casing part past an index 229 on the casing part 227.

As shown more particularly in FIGURE 14, a lock pin 230 is adapted to be moved into and out of engagement with teeth of the gear wheel 178 by the rocking motion of a handle 231 mounted on the frame adjacent such gear 178.

In operation, FIGURES 21 to 29 inclusive illustrate schematically the various sequential phases of movement of the machine by which the scriber traces a double looped figure of two symmetrical loops substantially in the form of a figure 8, while ratio is two to one, and angle setting of 191 is set at zero.

FIGURES 30 to 60 inclusive illustrate a few typical patterns traceable by the scriber. In connection with each of these figures appears data taken from the gage plate 206 and angle setting of the index disc whereby information is given with respect to revolutions per cycle, gear ratios and degree settings of crank pin 156 of the longer crank arm 157, which crank pin 156 is illustrated in FIGURE 16 as being in the down, neutral or origin position. Of these illustrated typical patterns, it will be noted that the patterns of FIGURES 30 and 31 are made in one revolution of shaft 139, and the ratio being one to one. Therefore, in this case there is no differential between the two shafts 139 and 158, and the pattern change of a straight line FIGURE 30 and the ellipse pattern FIGURE 31 are due only to the angle setting of the disc 191 from zero to 90 degrees or from equilibrium to fully out of equilibrium.

The pin 156 in FIGURE 16 moves clockwise as distinguished from the counterclockwise movement of the crank pin 137 of the drive shaft 139 viewed from FIGURE 15. The radial distance from the center of drive shaft 139 to the center of crank pin 137 is preferably approximately one-half the value of the similar distance from the center of the shaft 158 to the center of crank pin 156. A comparison of FIGURES 15 and 16 will indicate this differential.

The crank pin 156 can be set at any angular position from the origin point of FIGURE 16 quite independently of any initial adjustment of the crank pin 137 of the drive shaft 139. This is accomplished through the hand wheel 190 (FIGURES 14, 17 and 18). This hand wheel may be manually rotated while the gears of FIGURE 19 are in a disengaged position whereby no motion of the hand wheel 190 will be transferred to the drive shaft 139 although the follower shaft 186 will be rotated through the bevel gears 188, 189. The degree of the angular setting of the crank pin 156 will be shown on index disc 191 (FIGURE 14).

Pursuant to FIGURE 45, the crank pin 156 is set in the origin or neutral position of FIGURE 16 where it is also shown in the schematic position of FIGURE 21 at the start of the motion delineated in FIGURES 21 to 29 inclusive.

However, according to FIGURE 46 the crank pin 156 is set at the start at a 45 degree displacement clockwise from the origin point of 156.

According to FIGURE 35, the ratio selection being 1½ to 1, the crank pin 156 is set at 45 degrees. This is all done by rotary motion of the hand wheel 190 while the operator observes the index disc 191 on the edge of which appears angular settings corresponding to angular positions of the crank arm 157 and its crank pin 156, while in FIGURE 34 the ratio selection is the same and the crank pin 156 is set at zero degrees on the disc 191.

As soon as the proper setting of crank pin 156 is accomplished, the rock frame 198 is shifted from the position of FIGURE 19 to the engaged position of FIGURE 20 and the lock rod 208 inserted in the perforation 207 opposite the gear ratio stated in table 214 of the gage plate 206, which ratio is obtained from FIGURES 30-60 inclusive and from tabular matter which may be compiled for reference in operating the machine.

When the gears are engaged the crank 183 may be turned clockwise, as viewed in FIGURE 15, whereupon through the gears 179, 178 it will rotate the drive shaft 139 in a counterclockwise direction, driving the yoke 135, the connected pitman or crosshead 130 and the associated Peaucellier mechanism through a reciprocating motion involving alternate pushing and pulling thrust strokes. At the same time through the selected gear transmission the counter shaft 186 and the other drive shaft 158 will be rotated communicating to the other crank arm 157 and its crank pin 156 a rotary motion in a clockwise direction, as viewed from FIGURE 16, resulting in a reciprocating motion of the yoke 154, crosshead or pitman 149 and the entrained second Peaucellier mechanism. These two separate mechanisms have their focus in the vertex 124 at which the scriber or implement is located so that both Peaucellier mechanisms simultaneously contribute to a composite resultant movement in the implement or scriber, it being understood that the throw of the second Peaucellier mechanism is substantially twice that of the first Peaucellier mechanism due to the longer radial crank throw 157 (FIGURE 16), to obtain the resulting orbit pattern shape, namely, an oblong, twice as long as wide.

Incident to this composite movement of the two Peaucellier mechanisms generated by the rotation of the drive shaft 139, each rotation of the drive shaft 139 will be registered upon the counter wheel 217 so that at each rotation of the drive shaft 139 the wheel 217 will be moved a distance of one notch or tooth and the count will be observed through the window 228. A rotation of the drive shaft 139 and a corresponding angular movement of one tooth in the counter wheel 217 marks a revolution of shaft 139. The number of revolutions of shaft 139 required to produce a full cycle of a given pattern as designated in chart 215 of the gage plate 206 for a few exemplary patterns.

FIGURES 30-60 inclusive include such patterns and additional examples bearing in connection with the illustration the requisite revolutions of shaft 139 per cycle in numeration and gear ratio and angle settings. The machine may accomplish an infinite variety of other shapes and orbit patterns.

Each pattern requires a different number of revolutions of shaft 139 to complete the pattern. The number of such revolutions constitute a full cycle. The simultaneous relative positions occupied by the parts of the machine at any instant during the cycle constitute a "phase." Consequently the angle setting of the disc 191 is referred to as "phasing," as thereby the phase relationship of cranks 138 and 157 has been changed. The degree of such phasing is read in degrees on the disc 191. Such a change of phasing results in the relative angle change of position of the two cranks 138, 157.

The orbit patterns of FIGURES 30-60 inclusive were traced from graphs which illustrate the orbit path of a few of the movements possible by this mechanical motion. They are divided as follows: FIGURES 30 and 31 do not employ "ratio" or gear differential, FIGURE 30 being a straight line, traced from its center to one end and back to the opposite end, then returning to its center, resulting in a reciprocating motion, while the two cranks are phased zero degrees fully out of equilibrium or balance. FIGURE 31 shows the orbit of an ellipse for which the phasing is set at 90 degrees or in equilibrium or balance.

FIGURES 32-60 inclusive all employ gear differential of various values. It will be noted that those that have the same gear ratio are in pairs, one of which pair is phased in balance, while the other of such pair is phased fully out of balance, and those out of balance retrace their lines, see FIGURE 35 at 232. Such pairs are as follows:

In Balance      33 34 36 38 41 45 49 54 59
Fully out of Balance   32 35 37 39 42 46 50 53 60

The balance of the FIGURES 40, 43, 44, 47, 48, 51, 52, 55, 56, 57 and 58 are shown to clear up other characteristics of the effect of the phasing. By turning the hand wheel 190 to turn the phasing disc 191, which is laid out on its circumference and divided in degrees 0 to 360 degrees, such turning of the phasing disc by the hand wheel can be rotated either right or left. One direction is considered as a positive direction to the selected degrees of phasing, while turning in the opposite direction is considered negative phasing. Referring now to FIGURES 51 and 52, it will be seen that the ratio for both is the same, as well as the pattern, except that they are right and left-hand patterns. FIGURE 51 pattern made at 22½ degrees positive phasing, the starting point being 124, and FIGURE 52, the starting point 124, was set at 22½ degrees negative from zero. Both patterns are one-half out of balance.

If the phase setting had been made at 45 degrees positive or negative, the patterns would have been fully unbalanced and the lines at 234 and 235 would have ended at that point and reversed and retraced the same line for the patterns, back to the starting point. FIGURE 52 so modified is shown in FIGURE 64.

In FIGURES 51 and 52, the effect of positive and negative phasing occurs.

FIGURES 47 and 48 are shown as balanced. Patterns according to these figures could of course be made to appear fully unbalanced by altering the phasing.

FIGURES 55 and 56 are shown as balanced and likewise by altering phasing similar patterns may be developed fully unbalanced.

These FIGURES 55 and 56 are identical except that in FIGURE 55 the starting point 124 was at zero phasing while in FIGURE 56 the starting point 124 was at 45 degrees of phasing. The reason for this is that the measured distance of 124 of FIGURE 55 to 124 of FIGURE 56 equals 45 degrees or the repeat point of phasing, which would repeat again at 90 degrees, 135 degrees, 180 degrees, 225 degrees, 270 degrees, 315 degrees and 360 degrees, or zero. This repeating accounts for the 124 position in FIGURES 57 and 58.

FIGURE 58 pattern shows this repeat of 124 at the second repeat position of 90 degree phasing. This pattern would be fully unbalanced at 22½ degrees, 67½ degrees and at each reading by adding 45 degrees around the compass. Those from 22½ degrees to 157½ degrees inclusive are all positive phase, and those from 202½ degrees to 337½ degrees are negative phasing. This positive and negative phasing accounts for the right and left showing of the same patterns shown in FIGURE 51 (negative) and FIGURE 52 (positive).

However, all ratios do not require the same number of degrees to change from a balanced orbit to a fully unbalanced orbit, and all patterns could be partially unbalanced. The extent of such unbalance is governed by the number of degrees of setting of the disc 191, either positive or negative, and is less in degrees than that required for a fully unbalanced pattern. This may be cleared by observing FIGURE 63.

Figure 44:
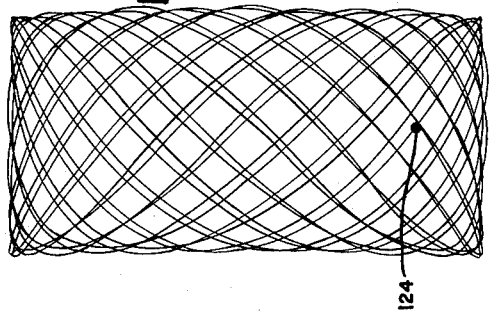
Figure 41:
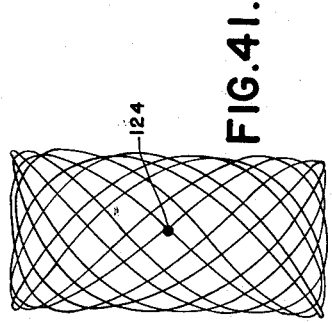
Figure 43:
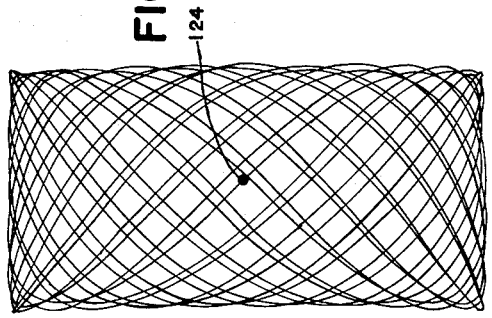
Figure 40:
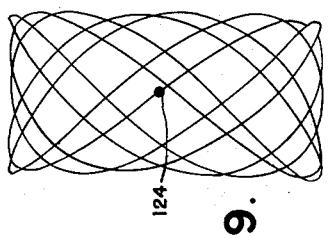
Figure 42:
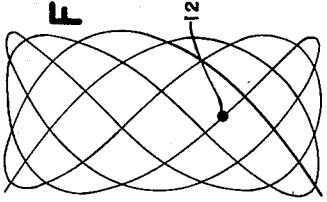
Figure 39:
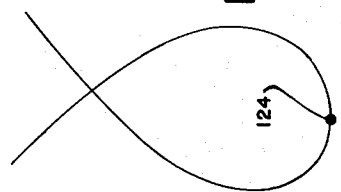
Figure 38:
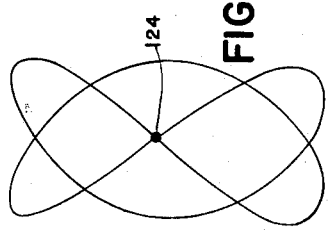

FIGURE 40 shows a balanced orbit with the starting point 124 at zero. FIGURES 43 and 44 show balanced orbits with the same ratio, for FIGURE 43 the starting point 124 being at zero, while for FIGURE 44 the starting point 124 is at 45 degrees, the first positive repeat position.

In FIGURES 30–60 inclusive the origin point is indicated by the numeral 124 at which the scriber is placed at the vertex point of connection of the two Peaucellier mechanisms.

According to FIGURE 30 this scriber point moves back and forth along the horizontal straight line through operation of the machine according to the settings stated below this FIGURE 30.

According to FIGURE 31 the origin point 124 is returned to after each cycle and is passed through in the event of retracing the oval figure. For this pattern, the cycle requires only one revolution of shafts 139 and 158, as in this pattern no ratio is employed; therefore, it reads ratio 1 to 1.

According to FIGURE 33, which is also a closed loop more complex pattern, the starting point 124 may be on the vertical center line at the base of the figure.

In FIGURE 35, which is an open loop figure in which the loops run into free ends 232, 233, the scriber starts at 124 and moves in either direction through the illustrated loops to one free end, for instance 232, thereupon reverses moving back through this loop to the crossover 124 and proceeding therefrom to form the other two overlapped loops ending in the free end 233, at which point the scriber or implement reverses through the last-mentioned two loops and eventually arrives at the origin point 124; or a double overlapped loop part of the pattern may be formed in the instance followed by the formation of the single loop terminating in the free end 232.

FIGURE 37 also shows what is termed an open loop figure because it has free ends requiring reversal movement of the tool after these free ends are reached.

FIGURE 46 shows a parabolic curve in which the origin point may be at 124 traceable by movements in opposite directions from this starting point 124 until the selected curve is generated along the desired directrix.

In FIGURE 53 the origin point 124 may be at or near the center point of the two relatively reversed parabolic curves or composite ogee curve.

FIGURE 60 shows a triple reverse curve with the starting and finishing point 124 in one leg of the lowermost curve.

With respect to FIGURE 45, which shows a double loop in the approximate form of a figure 8, FIGURES 21–29 inclusive illustrate progressive phase positions of the parts of the machine tracing such curve, while ratio is two to one, and the angle or phase setting is at zero.

FIGURE 21 shows that the setting of crank pin 156 is at the zero degree position. The crank pin 137 of the drive shaft 139 is also at the lowermost origin zero position. In this position parts 137, 134, 126 and 124 are in alignment and the corresponding parts 156, 153, 148, 145 and 124 are also in alignment and substantially normal to the line of the Peaucellier mechanisms. The two rectangular linkages are in an open position with the vertices 125, 127 at substantially their widest diversity and similarly the vertices 144 and 146 respectively at their widest diversity. The vertices 125 and 146 and the links 120 and 141 of the two rectangular linkages are overlapped.

FIGURE 22 shows the crank 138 and its crank pin 137 moved counterclockwise through a quadrant of 90 degrees and the crank 157 and its crank pin 156 moved through approximately one-half this distance, namely, substantially 45 degrees in a clockwise direction from its origin or start position, the gear ratio driving the shaft 156 at approximately one-half the rotation rate of the drive shaft 139. It will be seen that both pitmans and their connections exert pushing effort simultaneously upon the scriber or implement at 124 in intersecting directions at right angles to one another. Due to the mutual restraint put upon both mechanisms by the connection therebetween, both mechanisms are shown to have moved downwardly and to the right of the paper, the scriber tracing from the origin point O a slightly curved line D which becomes a part of the lower loop of the figure 8 pattern of FIGURE 45. In this FIGURE 22 the rectangular linkages are shown to have closed. By "closing" is meant the closer approach of the vertices 125, 127 and 144, 146 respectively.

In FIGURE 23 the crank pin 137 is shown to have moved through a subsequent quadrant and has now passed through 180 degrees of the circle while the crank pin 156 of the other mechanism has moved an angular distance of 90 degrees. This has caused the scriber at 124 to have traced the curve E and the rectangular linkages have both closed to greater extent.

In moving from the position of FIGURE 21 to that of FIGURE 22 the crank pin 137 has exerted a pushing thrust upon the linkages, but in moving from the position of FIGURE 22 to that of FIGURE 23 the thrust has been a pulling thrust.

In the case of the crank pin 156, both movements from FIGURE 21 to FIGURE 22 and from FIGURE 22 to FIGURE 23 both have been pushing thrusts.

In FIGURE 24 the crank pin 137 has progressed another 90 degrees movement in which it has continued to exert a pulling thrust upon the linkages. During this movement of the crank pin 137, the crank pin 156 has moved through an angle of approximately 45 degrees in a direction to now exert pulling thrust upon the linkages. The movements of FIGURES 23 and 24 have traced curves E and F and FIGURE 25 shows the further movement of the mechanisms producing the last curve section G which completes the lower loop, the scriber at 124 having in this FIGURE 25 arrived back at the original starting point marked O in this figure to correspond with the crossover point marked O in FIGURE 45. In achieving the completed lower loop it will be seen that the crank pin 137 has completed a full rotation, during the last quadrant movement, having exerted pushing thrust upon the linkages while the companion crank pin 156 of the other mechanism has continued through another arc at approximately 45 degrees still exerting pulling thrust upon the linkages.

In FIGURE 26 the motion has been continued by which crank pin 137 is moved through another first quadrant of its second revolution and arrived at substantially the position of FIGURE 22 exerting push thrust on the linkage throughout this movement, but due to the still pulling thrust motion of the crank pin 156 FIGURE 26 differs from FIGURE 22 in that the alignment is now through lateral link 133 to the vertex 127 and the linkages are all approximately above the line drawn between drive shaft 139 and vertex 127. In executing these movements the mechanisms have conjointly traced the curve line H initiating formation of the upper loop of the figure H shown in FIGURE 45.

Figures 27, 28:
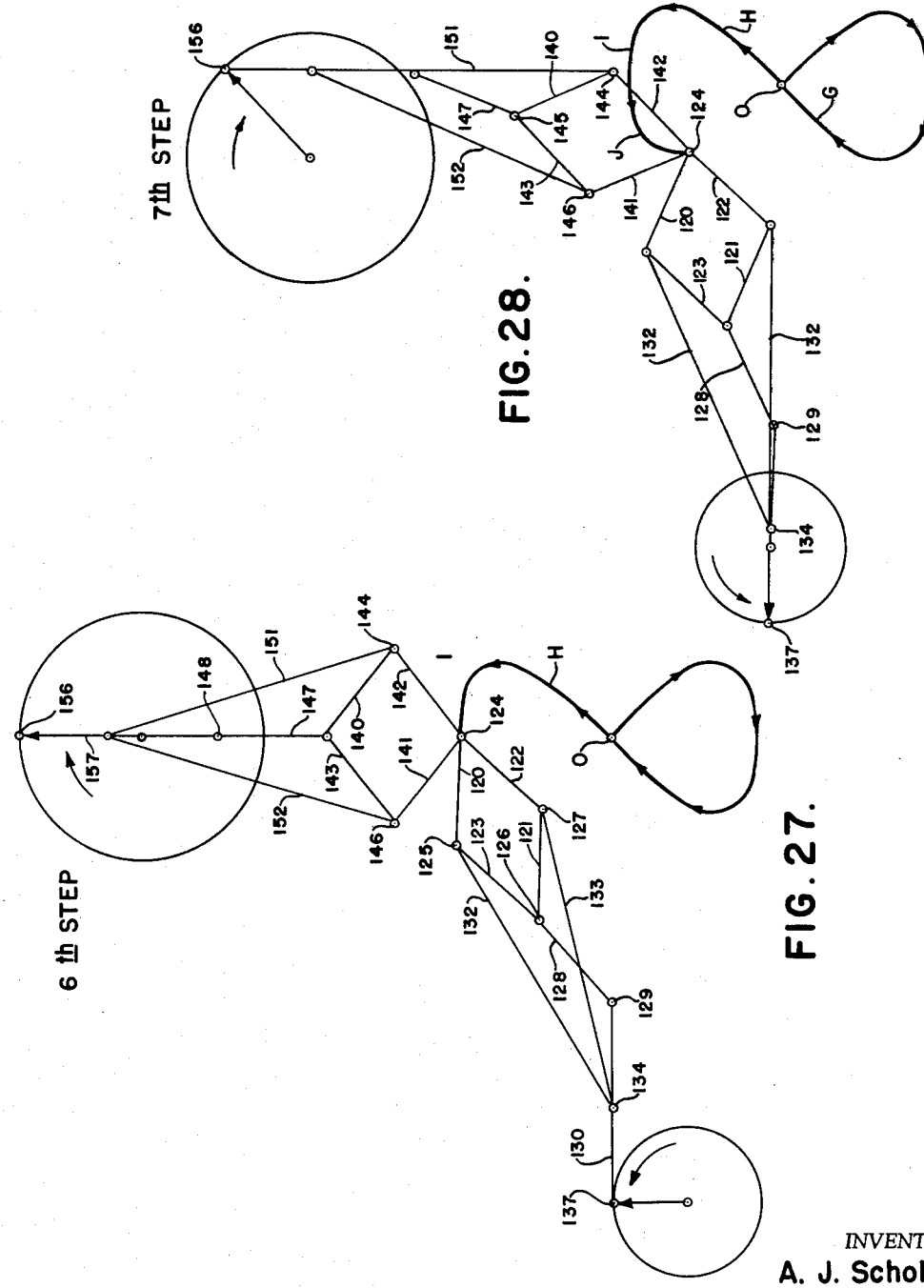

In FIGURE 27 both crank pins 137 and 156 have exerted pulling thrusts upon the linkages and caused the scriber at 124 to have traced the curve section I.

In FIGURE 28 showing subsequent positions of the crank pins, the crank pin 137 has exerted pulling thrust and the crank pin 156 has exerted pushing thrust causing the scriber to describe the curve section J.

Figure 29:
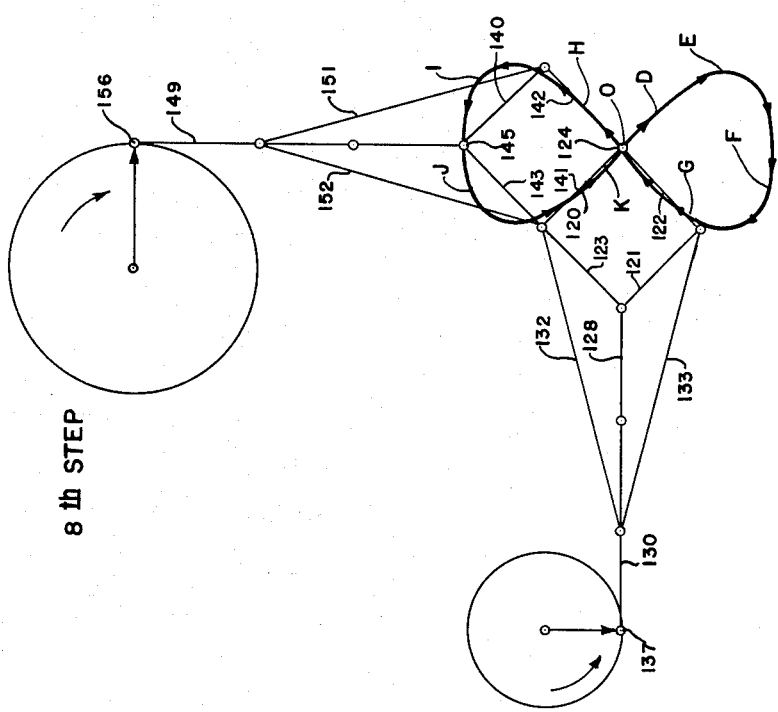

Lastly, FIGURE 29 shows the arrival of both crank pins 137 and 156 back to origin positions, one complete cycle for the two to one ratio, the crank pin 137 having executed two rotations for one full cycle of the crank pin 156. In moving from the position of FIGURE 28 to that of FIGURE 29, both crank pins have exerted pushing thrusts and have succeeded in completing the figure 8 pattern by the last curve section K thereof and scriber at 124 has returned to its original origin position O. Revolutions are counted from the crank pin 137.

It will be noted that these movements have caused the scriber to move from an origin point downwardly through the lower loop, thence to cross over through the origin point and from the upper loop by relatively reversing movement which brings the scriber back to the origin point in line with the initial curve section D of the lower loop, the rotation path of each loop being reversed.

In making the computations with respect to the various gear ratios, the gear wheels 196 and 202 each have 48 teeth, 196 being the master gear and 202 being the gear shift idler gear. The gear rack 203, comprising gears from 12 through 48 teeth, inclusive and secured to shaft 139, comprise the driver gears, one of which only is in mesh through idle master 202, for any given ratio. Any other number of teeth can be used on the master gear, and any variation tooth numbers for the driver gears. Therefore, the gear ratios are innumerable.

In the embodiment shown in FIGURES 14–62, the drive shaft 139 appears as a constant speed shaft, all the variation in relative rotations between shafts 139 and 158 being secured by changing the speed of shaft 158, due to the gear ratio selection. However, any change in rotation rate of shaft 139 is reflected in shaft 158, in accordance with the gear ratio selection in mesh. The phasing of any selected gear ratio does not change the relative rotation between the shafts 139 and 158.

Other suitable forms of gear ratio mechanism may be employed but that disclosed herein has been developed as having specially adaptable application to the mechanical movement of this invention.

The Scotch yokes are introduced to keep the cranks 138 and 157 in harmony when acceleration takes place during the revolutions of the cranks. If the yokes and mechanisms were not used, a distortion would occur in the various orbit patterns. The Peaucellier straight-line motions are incorporated into the pitmans so that the distances from the crank pins to the vertex point is always the same. This keeps the pitmans in harmony to prevent distortion error in the various orbit patterns. With straight pitman links, the distance would change from crank pin to vertex due to change of the angle between these two points. The Peaucellier mechanisms maintain this distance always the same.

It will be appreciated by those skilled in the art that any one-half of a cycle of many of the orbit patterns could be used as a sine wave generator. At the present time the common swash-plate is used, such as in the Sperry-Mason sine generator.

It will also be appreciated that the orbital patterns of movement can be used in both digital and analog computers.

The improved mechanical movement can also be employed to plot certain cams or direct the tool that machines these cams in two dimensions; and the improved mechanism may also be used in controls such as programming wherein the orbital pattern is plotted for opening or closing the electrical circuits.

Obviously it would be impossible to illustrate all the possible uses to which this novel mechanical movement could be put, but in the forms herein disclosed, it could be used by colleges and universities in the study of mechanical motion. While the movement shown herein is registering two dimensional motion, in order to record it on paper, this motion can be three dimensional by the addition of a third shaft, crank and pitman, acting upon the vertex point from a vertical angle with respect to the other two shafts which are angularly spaced on a horizontal plane.

Although I have disclosed herein the best forms of the invention known to me at this time, I reserve the right to all such modifications and changes as may come within the scope of the following claims.

What is claimed is:

1. In a mechanical movement, a frame, a post having an axis upright in its origin position and mounted relatively to the frame whereby at least a part of the post is capable of universal motion to trace in space at its axial line linear paths in at least wo directions from its origin position, and means for impressing on said post part motions of translation in said paths comprising at least two thrust members having positive and negative thrust reciprocating movements, said members disposed substantially normal to the axis of the post part at a substantially ninety degree angle with reference to one another measured at the axis of the post part in its origin position, pivotal means for making the post part captive to inner convergent ends of the members whereby the post part is driven by the conjoint action of the members and the inner convergent ends of the members both concurrently follow the motion of the connected post part, driving means for driving the members at relatively different speeds, and an implement connected to the post part at substantially the axis of the latter.

2. A mechanical movement as claimed in claim 1 further comprising second pivotal means connecting the outer divergent end portions of the members to the driving means on axes substantially parallel to the axis of the post part to permit the outer divergent ends of the members to rotate relatively to the driving means to accommodate shift of the members angularly about the axis of the post part incident to following the motion of the post part.

3. A mechanical movement as claimed in claim 1 in which the driving means comprises at least in part rotary cranks coupled to the outer divergent ends of the members, the planes generated by the rotation of the cranks passing through the axis of the post part in its origin position.

4. In a mechanical movement, a frame, a post mounted at one portion to the frame for universal movement, thrust members having inner convergent ends pivoted at angularly displaced points to the post and at points spaced from the universal mounting, the members diverging outwardly from the post, means for differentially driving the thrust members to impose on the post a gyratory motion in the pattern of two closed connected loops having a common crossover point tangent to the two loops, and an applicator on the post at an end removed from the universal mounting and partaking of the gyratory motion of the post end.

5 A mechanical movement as claimed in claim 4 further comprising means for subjecting the applicator to a periodic oscillating movement.

6. A mechanical movement comprising a frame, a post mounted relatively to the frame for universal and rotary movements, an applicator mounted on the post, means for imposing on the post a gyratory motion, an oscillator arm fixed to the post, and an oscillator link having a universal connection with the arm at one end and with the frame at its other end.

7. A mechanical movement as claimed in claim 1 in which said thrust members include rectangular linkages pivoted to the post at outermost vertices, reciprocating pitmans driven by said driving means, short center links pivoted to innermost vertices of the linkages and to the pitmans, and longer lateral links pivoted respectively to opposed lateral vertices of the rectangular linkages and converging therefrom to the pitmans and fulcrumed on the pitmans on pivots displaced from the short link pitmans pivots in directions away from the rectangular linkages.

8. A mechanical movement as claimed in claim 7 in which said driving means comprises cranks and slotted yokes receiving the cranks, said yokes being connected respectively to the reciprocating pitmans.

9. A mechanical movement as claimed in claim 8 further comprising settable means for setting the angular position of one crank with respect to the other crank.

10. A mechanical movement as claimed in claim 8 further comprising separate shafts for driving the cranks, selective gear change mechanism coupled to at least one of the shafts at variable rotation rates comparatively to that of the other shaft whereby to make and determine pattern changes.

References Cited in the file of this patent

UNITED STATES PATENTS

| 1,574,667 | Mackenzie | Feb. 23, 1926 |
| 2,520,556 | Massey | Aug. 29, 1950 |
| 2,831,186 | Deland | Feb. 8, 1954 |

FOREIGN PATENTS

| 13,682 | Great Britain | Oct. 10, 1887 |

UNITED STATES PATENT OFFICE
CERTIFICATE OF CORRECTION

Patent No. 2,990,720 July 4, 1961

Albert J. Scholtes

It is hereby certified that error appears in the above numbered patent requiring correction and that the said Letters Patent should read as corrected below.

Column 18, line 71, for "wo" read -- two --.

Signed and sealed this 28th day of November 1961.

(SEAL)
Attest:

ERNEST W. SWIDER
Attesting Officer

DAVID L. LADD
Commissioner of Patents

USCOMM-DC